(12) United States Patent
Wu et al.

(10) Patent No.: US 10,769,742 B2
(45) Date of Patent: Sep. 8, 2020

(54) SYSTEMS AND METHODS FOR PROVIDING INFORMATION FOR AN ON-DEMAND SERVICE

(71) Applicant: BEIJING DIDI INFINITY TECHNOLOGY AND DEVELOPMENT CO., LTD., Beijing (CN)

(72) Inventors: Zhaoxue Wu, Beijing (CN); Zexiang Huang, Beijing (CN); Shengwei Li, Beijing (CN); Fan Ding, Beijing (CN); Kaijie Qin, Beijing (CN); Yigang Wen, Beijing (CN); Chuang Liu, Beijing (CN); Yanjun Lu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 207 days.

(21) Appl. No.: 15/544,138

(22) PCT Filed: Jan. 20, 2016

(86) PCT No.: PCT/CN2016/071470
§ 371 (c)(1),
(2) Date: Jul. 17, 2017

(87) PCT Pub. No.: WO2016/116048
PCT Pub. Date: Jul. 28, 2016

(65) Prior Publication Data
US 2018/0033112 A1    Feb. 1, 2018

(30) Foreign Application Priority Data

Jan. 20, 2015 (CN) .......................... 2015 1 0028638
Jan. 23, 2015 (CN) .......................... 2015 1 0035598

(Continued)

(51) Int. Cl.
*G06Q 50/30*    (2012.01)
*H04W 4/029*    (2018.01)
(Continued)

(52) U.S. Cl.
CPC ............ *G06Q 50/30* (2013.01); *G01S 5/0063* (2013.01); *G06Q 30/0639* (2013.01); *G08G 1/00* (2013.01);
(Continued)

(58) Field of Classification Search
CPC ... G06Q 50/30; G06Q 10/06311; G08G 1/202
See application file for complete search history.

(56) References Cited

U.S. PATENT DOCUMENTS 7,263,437 B2    8/2007   Hirose et al.
7,689,349 B1 *  3/2010   Nesbitt .............. G01C 21/3484
                                                      701/432
(Continued)

FOREIGN PATENT DOCUMENTS

CN          1740809 A      3/2006
CN          1928943 A      3/2007
(Continued)

OTHER PUBLICATIONS

Pelzer et al., "A Partition-Based Match Making Algorithm for Dynamic Ridesharing", IEEE Transactions on Intelligent Transportation Systems, vol. 16, No. 5, Oct. 2015 (Year: 2015).*
(Continued)

*Primary Examiner* — Rupangini Singh
(74) *Attorney, Agent, or Firm* — Metis IP LLC

(57) ABSTRACT

The present disclosure relates to a method of providing information for an on-demand service. The method may include: receiving service request information from a service requester. The service request information may include information relating to a location of the service requester;

(Continued)

determining a candidate meetup location set based at least in part on the service request information. The candidate meetup location set may include at least one candidate meetup location; sending the candidate meetup location to the service requester; receiving processed data related to the candidate meetup location set by the service requester; and generating a processing result based at least in part on the processed data related to the candidate meetup location set by the service requester. Also disclosed is a system for implementing the method.

20 Claims, 17 Drawing Sheets

(30) Foreign Application Priority Data

| Apr. 3, 2015 | (CN) | ............................ 2015 1 0158678 |
|---|---|---|
| Apr. 8, 2015 | (CN) | ............................ 2015 1 0163520 |
| May 13, 2015 | (CN) | ............................ 2015 1 0243122 |
| Jun. 2, 2015 | (CN) | ............................ 2015 1 0295656 |
| Aug. 20, 2015 | (CN) | ............................ 2015 1 0515752 |
| Sep. 18, 2015 | (CN) | ............................ 2015 1 0600441 |

(51) Int. Cl.

| *G06Q 30/06* | (2012.01) |
|---|---|
| *G08G 1/00* | (2006.01) |
| *G01S 5/00* | (2006.01) |
| *H04L 29/08* | (2006.01) |
| *H04W 4/02* | (2018.01) |
| *G06F 16/9537* | (2019.01) |

(52) U.S. Cl.
CPC ............... *H04L 67/18* (2013.01); *H04W 4/02* (2013.01); *H04W 4/029* (2018.02); *G06F 16/9537* (2019.01)

(56) References Cited

U.S. PATENT DOCUMENTS

| 8,522,160 | B2 | 8/2013 | Imanishi | |
|---|---|---|---|---|
| 8,996,523 | B1 | 3/2015 | Fisher | |
| 9,631,933 | B1* | 4/2017 | Aula ........................ | E05F 15/70 |
| 2002/0034292 | A1 | 3/2002 | Tuoriniemi et al. | |
| 2004/0203901 | A1 | 10/2004 | Wilson et al. | |
| 2004/0236501 | A1 | 11/2004 | Hirose et al. | |
| 2006/0059023 | A1 | 3/2006 | Mashinsky | |
| 2008/0119203 | A1 | 5/2008 | Shalmon et al. | |
| 2009/0030885 | A1 | 1/2009 | DePasquale et al. | |
| 2011/0098923 | A1 | 4/2011 | Lee | |
| 2011/0301985 | A1 | 12/2011 | Camp et al. | |
| 2011/0313779 | A1 | 12/2011 | Herzog et al. | |
| 2012/0041675 | A1 | 2/2012 | Juliver et al. | |
| 2012/0235812 | A1 | 9/2012 | Maia et al. | |
| 2013/0066548 | A1 | 3/2013 | Gruen et al. | |
| 2013/0132140 | A1* | 5/2013 | Amin ...................... | G06Q 10/02 705/7.13 |
| 2013/0132887 | A1 | 5/2013 | Amin et al. | |
| 2013/0203440 | A1 | 8/2013 | Bilange et al. | |
| 2014/0046590 | A1 | 2/2014 | Needham et al. | |
| 2014/0129951 | A1 | 5/2014 | Amin et al. | |
| 2014/0278105 | A1 | 9/2014 | Canfield | |
| 2014/0342751 | A1 | 11/2014 | Wachter et al. | |
| 2015/0002539 | A1 | 1/2015 | Li et al. | |
| 2015/0012310 | A1 | 1/2015 | Shen | |
| 2015/0161564 | A1* | 6/2015 | Sweeney ........ | G06Q 10/063114 705/338 |
| 2015/0254581 | A1* | 9/2015 | Brahme ................. | G06Q 10/02 705/5 |
| 2015/0279040 | A1 | 10/2015 | Zhou et al. | |
| 2016/0155088 | A1* | 6/2016 | Pylappan ........... | G06Q 10/0836 705/333 |
| 2017/0059347 | A1* | 3/2017 | Flier ...................... | H04W 4/029 |
| 2017/0169535 | A1* | 6/2017 | Tolkin .............. | G06Q 10/06311 |
| 2017/0228683 | A1 | 8/2017 | Hu et al. | |

FOREIGN PATENT DOCUMENTS

| CN | 101000371 A | 7/2007 |
|---|---|---|
| CN | 101355714 A | 1/2009 |
| CN | 101378581 A | 3/2009 |
| CN | 101520950 A | 9/2009 |
| CN | 101788302 A | 7/2010 |
| CN | 102158804 A | 8/2011 |
| CN | 102636795 A | 8/2012 |
| CN | 102780971 A | 11/2012 |
| CN | 102829775 A | 12/2012 |
| CN | 102867410 A | 1/2013 |
| CN | 103134506 A | 6/2013 |
| CN | 103186980 A | 7/2013 |
| CN | 103398717 A | 11/2013 |
| CN | 103456161 A | 12/2013 |
| CN | 103456161 B | 12/2013 |
| CN | 103841517 A | 6/2014 |
| CN | 103903426 A | 7/2014 |
| CN | 104080045 A | 10/2014 |
| CN | 104089622 A | 10/2014 |
| CN | 104134342 A | 11/2014 |
| CN | 104236569 A | 12/2014 |
| CN | 104598506 A | 5/2015 |
| CN | 104602185 A | 5/2015 |
| CN | 104796856 A | 7/2015 |
| EP | 3179420 A1 | 6/2017 |
| JP | 2002032898 A | 1/2002 |
| JP | 2008146500 A | 6/2008 |
| JP | 2014048047 A | 3/2014 |
| KR | 20120132932 A | 12/2012 |
| KR | 20130037133 A | 4/2013 |
| KR | 20130083034 A | 7/2013 |
| WO | 2016116048 A1 | 7/2016 |

OTHER PUBLICATIONS

International Search Report for PCT/CN2016/071470 dated Apr. 22, 2016, 3 pages.
First office action for Chinese application No. 201510515752.6 dated Jan. 25, 2017, 17 pages.
First office action for Chinese application No. 201510035598.2 dated Jun. 29, 2017, 18 pages.
Singapore Search Report in Singapore Application No. 11201705030P dated Apr. 25, 2018, 2 pages.
First Examination Report in New Zealand Application No. 733863 dated Apr. 20, 2018, 6 pages.
Canadian Search Report in Canadian Application No. 2,974,452 dated Jun. 16, 2018, 6 pages.
The Korean Preliminary Rejection in Korean Application No. 10-2017-7023047 dated Aug. 3, 2018, 9 pages.
The Examination report in Australian Application No. 2016208929 dated Oct. 1, 2018, 5 pages.
The second Office Action in Canadian Application No. 2974452 dated Jun. 3, 2019, 6 pages.
The Final Notice of Preliminary Rejection in Korean Application No. 10-2017-7023047 dated Nov. 28, 2019, 11 pages.
The Office Action in Canadian Application No. 2974452 dated May 1, 2020, 4 pages.
First Examination Report in Indian Application No. 201717025883 dated Jul. 11, 2020, 8 pages.

* cited by examiner

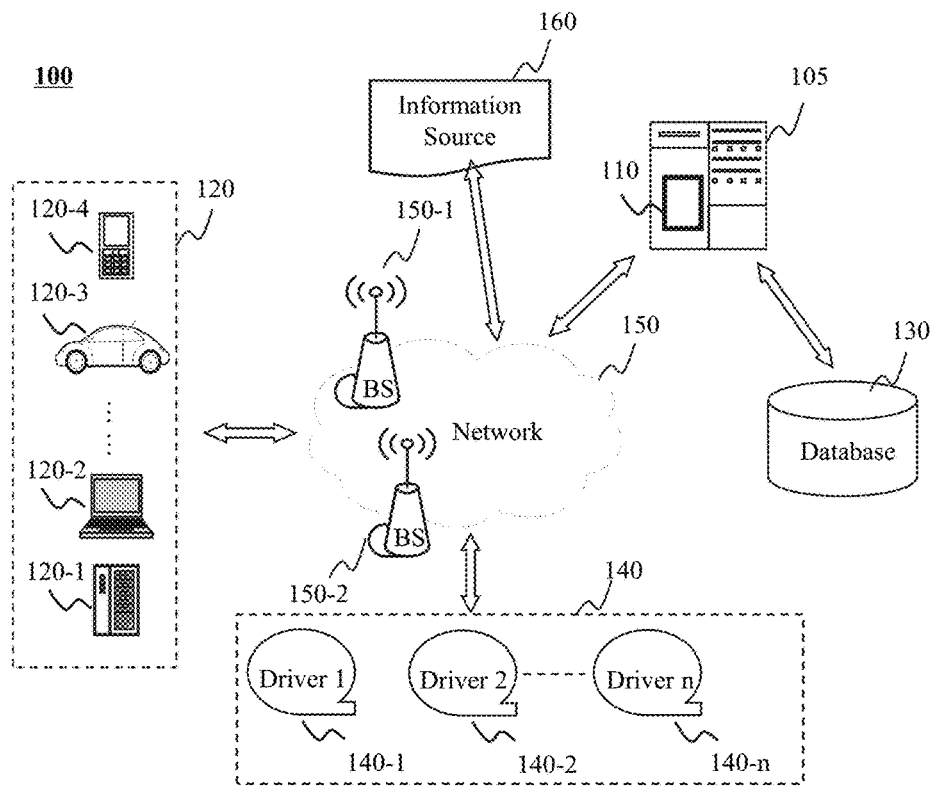
FIG. 1-A
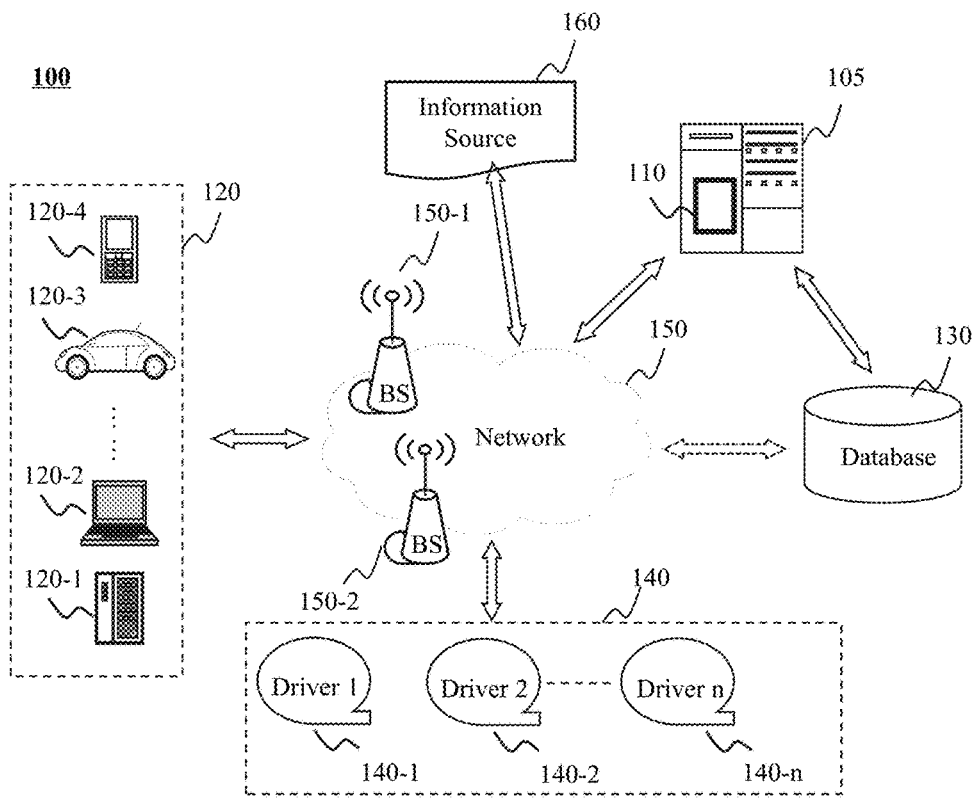
FIG. 1-B

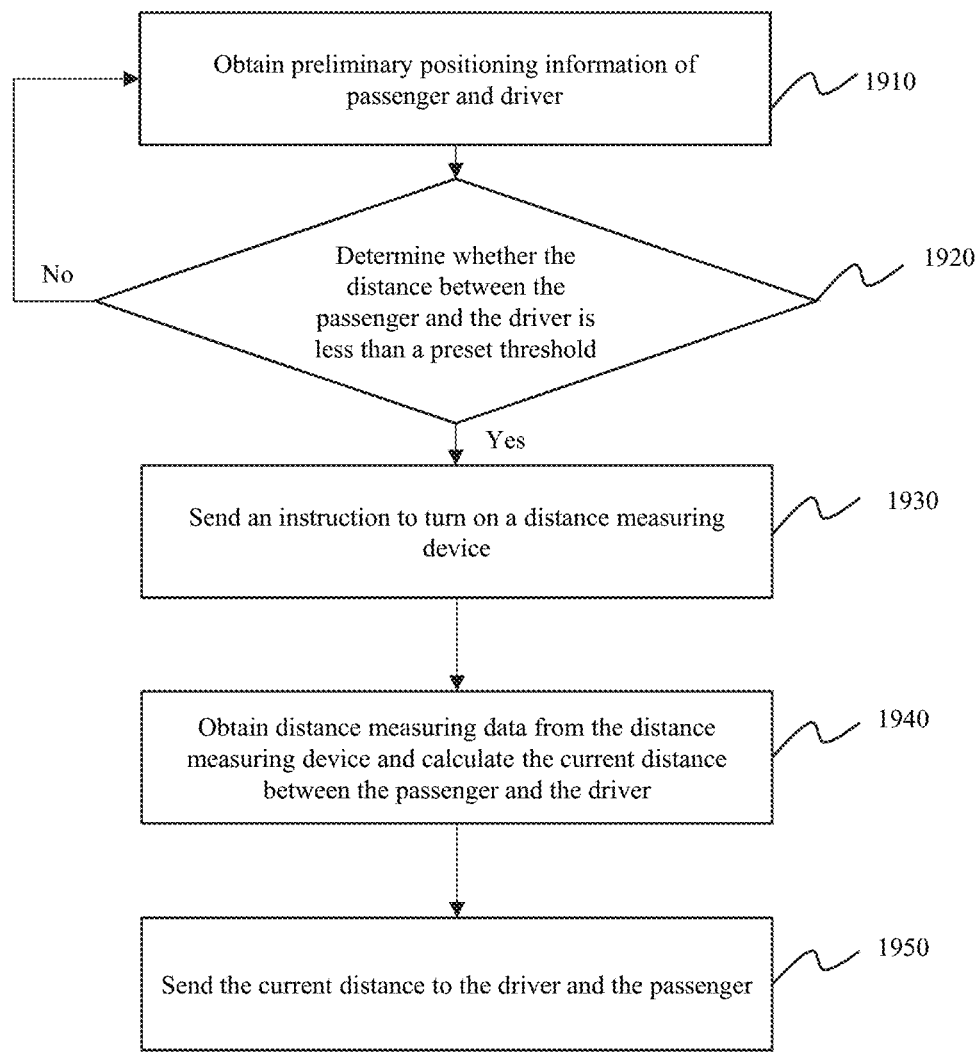
FIG. 19-A

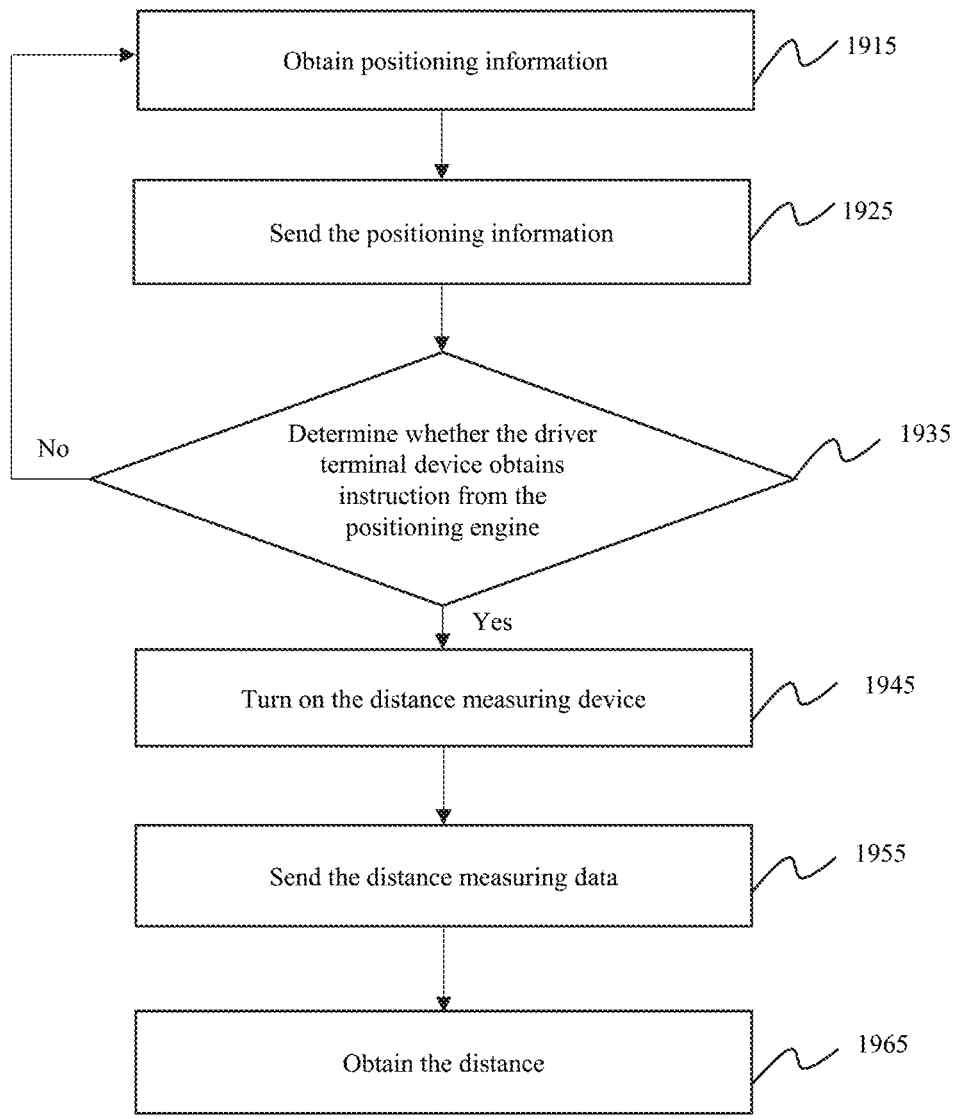
FIG. 19-B

SYSTEMS AND METHODS FOR PROVIDING INFORMATION FOR AN ON-DEMAND SERVICE

CROSS-REFERENCE TO RELATED APPLICATIONS

This application is a U.S. national stage under 35 U.S.C. 0.5371 of International Application No. PCT/CN2016/071470, filed on Jan. 20, 2016, which claims priority of Chinese Application No. 201510028638.0, filed on Jan. 20, 2015, Chinese Application No. 201510035598.2, filed on Jan. 23, 2015, Chinese Application No. 201510158678.7, filed on Apr. 3, 2015, Chinese Application No. 201510163520.9, filed on Apr. 8, 2015, Chinese Application No. 201510243122.8, filed on May 13, 2015, Chinese Application No. 201510295656.5, filed on Jun. 2, 2015, Chinese Application No. 201510515752.6 filed on Aug. 20, 2015, and Chinese Application No. 201510600441.X, filed on Sep. 18, 2015, the entire contents of each of which are hereby incorporated by reference.

TECHNICAL FIELD

This disclosure generally relates to a system and method for providing information for an on-demand service, and more particularly, to a system and method for providing information for an on-demand service using mobile Internet technologies and data processing technologies.

BACKGROUND

On-demand services have become increasingly popular. Taking a transportation service as an example, a passenger may send a service request using an application installed on a device of the passenger and wait for a driver to pick up him. Existing transportation service applications can navigate based on positioning information of a device. However, it might be time consuming for a driver and a passenger to meet at a meetup location using the existing transportation service applications because of positioning errors, imprecise positioning locations or unfamiliarity with the meetup location by the driver and/or the passenger. This may affect the efficiency of transportation services and may compromise user experience.

SUMMARY

In one aspect of the present disclosure, a method of providing information for an on-demand service is provided. The method may include: receiving service request information from a service requester. The service request information may include information relating to a location of the service requester; determining a candidate meetup location set based at least in part on the service request information. The candidate meetup location set may include at least one candidate meetup location; sending the candidate meetup location set to the service requester; receiving processed data related to the candidate meetup location set by the service requester; and generating a processing result based at least in part on the processed data related to the candidate meetup location by the service requester.

In another aspect of the present disclosure, a system configured to provide information for an on-demand service is provided. The system may include a tangible computer-readable storage medium and a processor. The computer-readable storage medium may be configured to store an executable module. The executable module may include a service requester interface module. The service requester interface may be configured to receive service request information from a service requester. The service request information may include information relating to a location of the service requester. The service requester interface module may be configured to receive processed data related to a candidate meetup location set from the service requester. The candidate meetup location set may include at least one candidate meetup location. The service requester interface module may be configured to send the candidate meetup location set to the service requester. The executable module may include a processing module. The processing module may be configured to determine the candidate meetup location set based at least in part on the service request information. The processing module may be configured to generate a processing result based at least in part on the processed data related to the candidate meetup location set from the service requester. The processor may be configured to execute the executable module stored in the computer-readable medium.

According to one embodiment of the present disclosure, the processed data related to the candidate meetup location set may be generated by processing the candidate meetup location set by the service requester. The processing may include at least one of: selecting a candidate meetup location from the candidate meetup location set; removing a candidate meetup location from the candidate meetup location set; modifying a candidate meetup location of the candidate meetup location set; or adding a location to the candidate meetup location set.

According to one embodiment of the present disclosure, the method may further include sending the candidate meetup location set to a service provider.

According to one embodiment of the present disclosure, the method may further include receiving processed data related to the candidate meetup location by the service provider.

According to one embodiment of the present disclosure, the processed data related to the candidate meetup location set may be generated by processing the candidate meetup location set by the service provider. The processing may include at least one of: selecting a candidate meetup location from the candidate meetup location set; removing a candidate meetup location from the candidate meetup location set; modifying a candidate meetup location of the candidate meetup location set; or adding a location to the candidate meetup location set.

According to one embodiment of the present disclosure, the method may further include sending the processing result to the service provider.

According to one embodiment of the present disclosure, the method may further include evaluating the candidate meetup location.

According to one embodiment of the present disclosure, the evaluation of the candidate meetup location may be based on a distance between the candidate meetup location and the location of the service requester.

According to one embodiment of the present disclosure, the evaluation of the candidate meetup location may be based on historical information relating to the candidate meetup location.

According to one embodiment of the present disclosure, the method may further include sending the processing result to a service provider.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 1-A illustrates a schematic diagram of a network environment containing an on-demand service system according to some embodiments of the present disclosure illustrate;

FIG. 1-B illustrates a schematic diagram of a network environment containing an on-demand service system according to another embodiment of the present disclosure;

FIG. 19-A is a flow chart of an exemplary process for coordinating a passenger terminal device and a driver terminal device to measure distance by a positioning engine according to some embodiments of the present disclosure;

FIG. 19-B is a flow chart of an exemplary process for measuring distance by a driver terminal device according to some embodiments of the present disclosure;

DETAILED DESCRIPTION

Figure 2:
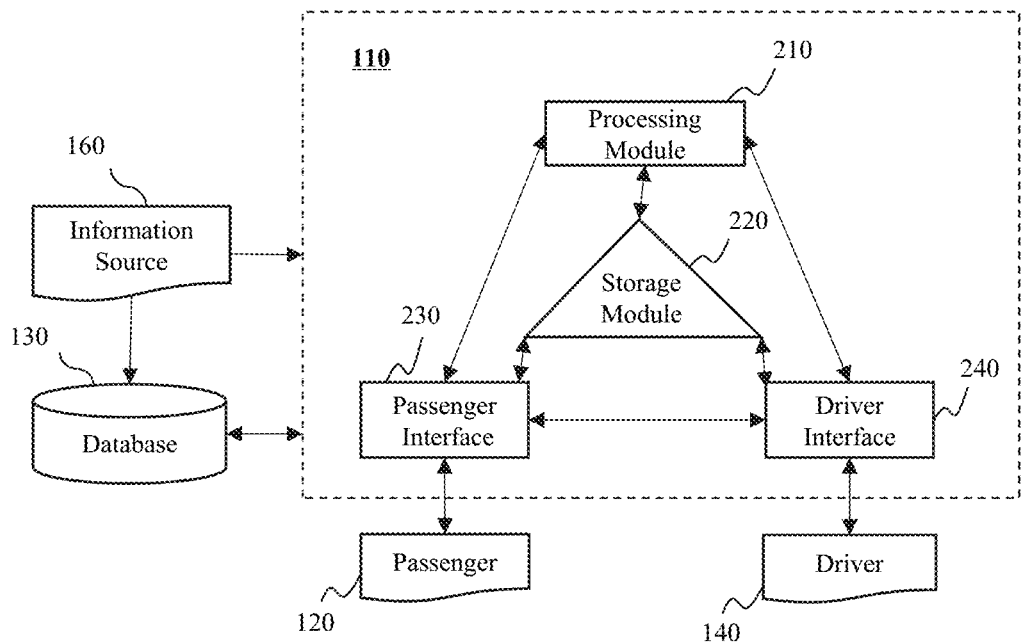
FIG. 2 is a schematic diagram of an on-demand service system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Embodiments of the present disclosure may be applied to different transportation systems including but not limited to land transportation, sea transportation, air transportation, space transportation, or the like, or any combination thereof. A vehicle of the transportation systems may include a rickshaw, travel tool, taxi, chauffeured car, hitch, bus, rail transportation (e.g., a train, a bullet train, high-speed rail, and subway), ship, airplane, spaceship, hot-air balloon, driverless vehicle, or the like, or any combination thereof. The transportation system may also include any transportation system that applies management and/or distribution, for example, a system for sending and/or receiving an express. The application scenarios of different embodiments of the present disclosure may include but not limited to one or more webpages, browser plugins and/or extensions, client terminals, custom systems, intracompany analysis systems, artificial intelligence robots, or the like, or any combination thereof. It should be understood that application scenarios of the system and method disclosed herein are only some examples or embodiments. Those having ordinary skills in the art, without further creative efforts, may apply these drawings to other application scenarios. For example, other similar user order receiving system.

The term "user," "passenger," "requester," "service requester," and "customer" in the present disclosure are used interchangeably to refer to an individual, an entity or a tool that may request or order a service. The party may be an individual or device. Also, the term "driver," "provider," "service provider," and "supplier" in the present disclosure are used interchangeably to refer to an individual, an entity, or a device that may provide a service or facilitate the providing of the service. In addition, the term "user" in the present disclosure may refer to an individual, an entity, or a device that may request a service, order a service, provide a service, or facilitate provision of the service.

FIG. 1-A is a schematic diagram of a network environment 100 according to some embodiments of the present disclosure. The network environment 100 may include an on-demand service system 105, one or more passenger terminal devices 120, one or more databases 130, one or more driver terminal devices 140, one or more networks 150, and one or more information sources 160. The on-demand service systems 105 may include a positioning engine 110. In some embodiments, the positioning engine 110 may be a system configured to analyze and process the collected information to generate an analytical result. The positioning engine 110 may be a server, or a server group connected via a wired or a wireless network. The server group may be centralized (e.g., a data center) or distributed (e.g., a distributed system). The positioning engine 110 may be centralized or distributed.

The passenger terminal 120 and the driver terminal 140 may be referred to as a user that may be an individual, a tool or other entity directly relating to service orders such as a service order requester and a service provider respectively. A passenger may be a service requester. In the present disclosure, "passenger," "passenger terminal," and "passenger terminal device," may be used interchangeably. A driver may be a service provider. In the present disclosure, "driver," "driver terminal," and "driver terminal device" may be used interchangeably. In some embodiments in which a user is a device, the passenger terminal 120 may include a desktop computer 120-1, a laptop computer 120-2, a built-in device of a vehicle 120-3, a mobile device 120-4, or the like, or any combination thereof. Herein, the built-in device 120-3 may be a carputer, or the like; the mobile device 120-4 may be a smartphone, a personal digital assistance (PDA), a tablet computer, a handheld game player, smart glasses, a smartwatch, a wearable device, a virtual reality device, an augmented reality device (e.g., Google™ Glass, Oculus Rift™, HoloLens, Gear™ VR, etc.), or the like, or any combination thereof. The driver terminal 140 may also include one or more similar devices described above.

The positioning engine 110 may directly access information stored in the database 130 and/or read information from or write information to the database 130. The positioning engine 110 may also access information provided by the user terminal 120 or 140 via the network 150. In some embodiments, the database 130 may include any device that is capable of storing data. The database 130 may be used to store data that are collected by the passenger terminal 120 and/or the driver terminal 140, and data that used, generated or outputted by the positioning engine 110. The database 130 and the on-demand service system 105 and or one or more portions of the system 105 (e.g., the positioning engine 110) may be connected via one or more wired and/or wireless communication links.

The network 150 may be a single network or a combination of networks. For example, the network 150 may include a local area network (LAN), a wide area network (WAN), a public network, a private network, a proprietary network, a public switched telephone network (PSTN), the Internet, a wireless network, a virtual network, or any combination thereof. The network 150 may include multiple network access points, such as a wired or wireless access point, including a base station 150-1, a base station 150-2, a network switch point, etc. Through the network access points, any data source may be connected to the network 150 and transmit information via the network 150. Merely for illustration, the driver terminal 140 in a transportation service is taken as an example, and it is not intended to limit the scope of the present disclosure. For example, the driver terminal 140 may be a mobile phone, a tablet computer, etc. The network environment 100 of the driver terminal 140 may be a wireless network (e.g., Bluetooth® network, wireless local area network (WLAN), Wi-Fi, etc.), mobile networks (e.g., 2G, 3G, 4G signals, etc.), or other communication methods (e.g., virtual private network, (VPN), shared network, near field communication (NFC), ZigBee®, etc.).

The information source 160 may be a source configured to provide other information for the system 105. The information source 160 may provide the system 105 with service information, such as weather conditions, traffic information, information of laws and regulations, news events, life information, life guide information, or the like. The information source 160 may exist in the form of a single central server, multiple servers connected via the network, multiple personal devices, etc. When the information source 160 is implemented using multiple personal devices, the personal devices can generate content (e.g., as referred to as the "user-generated content"), for example, by uploading text, voice, image and video to a cloud server. An information source may be generated by the multiple personal devices and the cloud server.

Taking transportation service as an example, the information source 160 may include a municipal service system containing map information and city service information, a real-time traffic broadcasting system, a weather broadcasting system, a news network, or the like. The information source 160 may be physical device, such as a common speed measuring device, a sensor, or an IOT (Internet of Things) device, including a vehicle speedometer, a radar speedometer, a temperature and humidity sensor, etc. The information source 160 may be a source configured to obtain news, messages, real-time road information, or the like. For example, the information source 160 may be a network information source that includes an Internet news group based on Usenet, a server over the Internet, a weather information server, a road condition information server, or the like, or any combination thereof. Taking food delivery service as an example, the information source 160 may be a system storing information of multiple food providers in a particular region, a municipal service system containing map information and city service information, a real-time traffic broadcasting system, a weather broadcasting system, a news network, or the like. The examples described herein are not intended to limit the scope of the information source or the type of services provided by the information source.

Any device or network that can provide information of the services may be designated as an information source in the present application.

In some embodiments, the on-demand service system 105 and different sections in the network environment 100 may be communicated based on orders. The subject matter of an order may be a product. In some embodiments, the product may be a tangible product or an intangible product. The tangible product may be any object with a shape or a size, including food, medicine, commodities, chemical products, electrical appliances, clothing, vehicles, house properties, luxuries, or the like, or any combination thereof. The intangible product may include service products, financial products, intellective products, Internet products, or the like, or any combination thereof. The Internet products may include any product that satisfies the user's requirements on information, entertainment, communication, or business. There are many methods of classifying the Internet products. Taking the classification method based on host platform as an example, the Internet products may include personal host products, Web products, mobile Internet products, commercial host platform products, embedded products, or the like, or any combination thereof. The mobile Internet product may be a software, a program or a system used in mobile terminals. The mobile terminal may include but not limited to a laptop computer, a tablet computer, a mobile phone, a personal digital assistant (PDA), an electronic watch, a POS machine, a carputer, a television, or the like, or any combination thereof. For example, the mobile Internet product may include software or applications of social communication, shopping, travel, entertainment, learning, or investment used in the computer or the mobile phone. The travel software or application may be a trip software or application, a vehicle booking software or application, a map software or application, or the like. The vehicle booking software or application may be used to book horses, carriages, rickshaws (e.g., two-wheeled bicycles, three-wheeled bicycles, etc.), vehicles (e.g., taxis, buses, etc.), trains, subways, ships, aircrafts (e.g., airplanes, helicopters, space shuttles, rockets, hot air balloons, etc.), or the like, or any combination thereof.

FIG. 1-B is a schematic diagram illustrating the network environment 100. FIG. 1-B is similar to FIG. 1-A. In FIG. 1-B, the database 130 is independent and may be directly connected to the network 150. The on-demand service system 105 or a part of the system 105 (e.g., the positioning engine 110), and/or the user terminal 120 or 140 may directly access the database 130 via the network 150.

In FIG. 1-A and/or FIG. 1-B, the database 130 and the on-demand service system 105, a part of system 105 (e.g., the positioning engine 110), and/or the user terminal device 120 or 140 may be connected in different ways. The access permission of each device to the database 130 may be limited. For example, the on-demand service system 105, or a part of the system 105 (e.g., the positioning engine 110) may have the highest level of access permission to the database 130, e.g., permission to read or modify public or personal information in the database 130 are allowed; the passenger terminal device 120 or the driver terminal device 140 may be permitted to read some of the public information or the personal information relating to users when certain conditions are satisfied. For example, the on-demand service system 105 may update or modify the public information or the user related information in the database 130, based on one experiences of a user (a passenger or a driver) using the on-demand service system 105. For another example, when receiving a service order from a passenger 120, a driver 140 may view some of the information of the passenger 120 in the database 130. However, the driver 140 may not modify the information of the passenger in the database 130 on his/her own, and only report the modification to the on-demand service system 105 so that the on-demand service system 105 may determine whether to modify the information of the passenger 120 in the database 130 accordingly or not. For another example, when receiving a service request from a driver 140, a passenger 120 may view some of information (e.g., user rating information, driving experiences, etc.) of the driver 140 in the database 130, however, the passenger 120 may not modify the information of the driver 140 in the database 130 on his/her own, but may only report the modification to the on-demand service system 105 so that the system 105 may determine whether or not to modify the information of the driver 140 in the database 130 accordingly.

It should be noted that the above description of the service system based on locations is provided for the purposes of illustration, and not intended to limit the scope of the present disclosure. For persons having ordinary skills in the art, modules may be combined in various ways, or connected with other modules as sub-systems and various variations and modifications may be conducted under the teaching of the present disclosure. However, those variations and modifications may not depart the spirit and scope of this disclosure. For example, the database 130 may be a cloud computing platform with data storing function that includes but not limited to a public cloud, a private cloud, a community cloud, a hybrid cloud, etc. All such modifications are within the protection scope of the present disclosure.

FIG. 2 is a schematic block diagram of an exemplary system according to some embodiments of the present disclosure. For brevity, the on-demand service system 105 is not shown in the figure and the positioning engine 110 is illustrated as an example. The positioning engine 110 may include one or more processing modules 210, one or more storage modules 220, one or more passenger interfaces 230 and one or more driver interfaces 240. The modules of the positioning 110 may be centralized or distributed. One or more modules of the positioning 110 may be local or remote. In some embodiments, the positioning engine 100 may be a website server, a file server, a database server, a FTP server, an application server, a proxy server, a mail server, or the like, or any combination thereof.

In some embodiments, the positioning engine 110 may receive information from and/or send processed information to a passenger 120 through the passenger interface 230. Information may be directly obtained from one or more passenger terminal devices 120 and/or one or more driver terminal devices 140 through the passenger interface 230 and/or the driver interface 240 via the network 150. Alternatively or additionally, information may be directly received from the information source 160. The method of sending or receiving the information may be indirect. The processing module 210 may obtain required information by sending requests to one or more information sources 160. Information in the information source 160 may include but is not limited to weather conditions, road conditions, traffic conditions, or the like, or any combination thereof.

In some embodiments, the processing module 210 may be configured to process related information. The processing module 210 may send the processed information to the passenger interface 230 and/or the driver interface 240. The methods of information processing may include but not limited to storing, classifying, filtering, converting, calculating, searching, predicating, training, or the like, or any combination thereof. In some embodiments, the processing module 210 may include but not limited to a Central Processing Unit (CPU), an Application Specific Integrated Circuit (ASIC), an Application Specific Instruction Set Processor (ASIP), a Physics Processing Unit (PPC), a Digital Processing Processor (DSP), a Field-Programmable Gate Array (FPGA), a Programmable Logic Device (PLD), a processor, a microprocessor, a controller, a microcontroller, or the like, or any combination thereof.

In some embodiments, the passenger interface 230 and driver interface 240 may be used to obtain information from the passenger 120 and the driver 140, respectively. Herein, the obtained information may be information about requests for service, information about a current location of a passenger or a driver, information about a text sent by a passenger 120/a driver 140, or any information sent by the passenger 120/the driver 140 (e.g., uploaded information of images, video content, audio content, etc.). The obtained information may be stored in the storage module 220 or calculated and processed by the processing module 210.

In some embodiments, the passenger interface 230 and the driver interface 240 may output information that is analyzed and processed by the processing module 210. In some embodiments, the information may be optimized positioning information, direct information of an order, or processed information of an order. The outputted information may be sent to the passenger 120 and/or the driver 140. The outputted information that is not sent may be stored in the database 130 or the storage module 220.

In some embodiments, the database 130 may be configured in the background of the on-demand service system 105 (as shown in FIG. 1-A). In some embodiments, the database 130 may be a stand-alone device and may directly connect with the network 150 (e.g., as shown in FIG. 1-B). In some embodiments, the database 130 may be a part of the on-demand service system 105 or the positioning engine 110. The database 130 may refer to any device that can store data. The database 130 may be used to store data collected from the user 120/140 and/or the information source 160. The database 130 can also store various data generated by the positioning engine 110. The database 130 or other storage devices of the system may be referred to as medium with a read/write function. The database 130 or other storage devices of the system may be internal or external devices. The connection between the database 130 and other storage devices in the system may be wired or wireless. The database 130 or other storage devices of the system may include but not limited to a hierarchical database, a network database, a relational database, or the like, or any combination thereof.

The database 130 or other storage device of the system may digitize information, and then store the digitalized information in an electrical, magnetic or optical storage device. The database 130 or other storage devices of the system may be used to store various information such as programs, data, etc. The database 130 or other storage devices of the system may be configured to store information in the form of electric energy, e.g., multiple memories, a random access memory (RAM), a read only memory (ROM), or the like. The RAM may include but not limited to a decatron, a selectron, a delay line memory, a Williams tube, dynamic random access memory (DRAM), a static random access memory (SRAM), a thyristor random access memory (T-RAM), a zero capacitor random access memory (Z-RAM), or the like, or any combination thereof. The ROM may include but not limited to a bubble memory, a twistor memory, a thin film memory, a magnetic plated wire memory, a magnetic-core memory, a magnetic drum memory, a CD-ROM, a hard disk, a tape, an early non-volatile random access memory (NVRAM), a phase-change memory, a magneto-resistive random access memory, a ferroelectric random access memory, a nonvolatile SRAM, a flash memory, an electrically erasable programmable read-only memory, an erasable programmable read-only memory, a programmable read-only memory, a mask ROM, a floating connected gate random access memory, a Nano random access memory, a racetrack memory, a variable resistive random access memory, a programmable metallization unit, or the like, or any combination thereof. The database 130 or other storage devices of the system may be used to store information utilizing magnetic energy such as a hard disk, a software, tape, a magnetic-core memory, a bubble memory, a USB flash disk, flash memory, or the like. The database 130 or other storage devices of the system may be used to store information in the form of optics such as a compact disc (CD), a digital video disc (DVD), or the like. The database 130 or other storage device of the system may be used to store information in the form of magneto-optic, e.g., magnetic disc, or the like. The method of accessing the database 130 or other storage device of the system 105 may include random access, serial access storage, read-only access, or the like, or any combination thereof. The database 130 or other storage devices of the system 105 may be a volatile memory or a nonvolatile memory. It should be noted that the above description of storage devices is provided for the purpose of illustration, and not intended to limit the scope of the present disclosure. The database 130 or other storage devices of the system 105 may be local or remote.

It should be noted that the processing module 210 and/or the database 130 described above may reside in the user terminal, or implement corresponding functions via a cloud computing platform. The cloud computing platform may include but not limited to a storage-based cloud platform mainly used for data storing, a calculation-based cloud platform mainly used for data processing, a hybrid cloud platform used for both data storing and data processing, etc. The cloud platform used by the user terminal may be a public cloud, a private cloud, a community cloud, a hybrid cloud, or the like. For example, some order information and/or non-order information obtained by the user terminal may be calculated and/or stored by the user cloud platform according to actual requirements. Some other order information and/or non-order information may be calculated and/or stored by a local processing module and/or a system database.

It should be understood that the positioning engine 110 in FIG. 2 may be implemented by a variety of methods. For example, the positioning engine 110 may be implemented by a hardware, a software or a combination of them. The hardware may be implemented by a dedicated logic. The software may be stored in a memory and may be implemented by an appropriate instruction executing system (e.g., a microprocessor, a dedicated design hardware, etc.). It will be appreciated by those skilled in the art that the above method and system may be implemented by computer-executable instructions and/or embedding in control codes of a processor. For example, the control codes may be provided by a medium such as a disk, a CD or a DVD-ROM, a programmable memory device such as read-only memory (e.g., firmware), or a data carrier such as an optical or electric signal carrier. The positioning engine 110 and its modules may not only be implemented by very large scale integrated circuits or gate arrays, semiconductor devices such as logic chips, transistors, or hardware circuits of programmable hardware devices such as field programmable gate arrays, programmable logic devices, but may also be implemented by software executed in various types of processors, or a combination of the above hardware circuits and software (e.g., firmware).

It should be noted that the above description of the positioning engine 110 is provided for the purposes of illustration, and not intended to limit the scope of the present disclosure. For persons having ordinary skills in the art, modules may be combined in various ways, or connect with other modules as sub-systems and various variations and modifications may be conducted under the teaching of the present disclosure. However, those variations and modifications may not depart the spirit and scope of this disclosure. For example, the processing module 210, the storage module 220, the passenger interface 230, the driver interface 240, and the database 130 may be different modules in one system, or may be combined as a single module to perform the corresponding functions of two or more of the above modules. For example, the passenger interface 230 and the driver interface 240 may be combined as a single interface that can interact with the passenger terminal device 120 and the driver terminal device 140 at the same time. For example, the database 130 may be included in the positioning engine 110, and all functions of the database 130 and the storage module 220 may be implemented by a single storage device. All such modifications are within the protection scope of the present disclosure.

Figure 3:
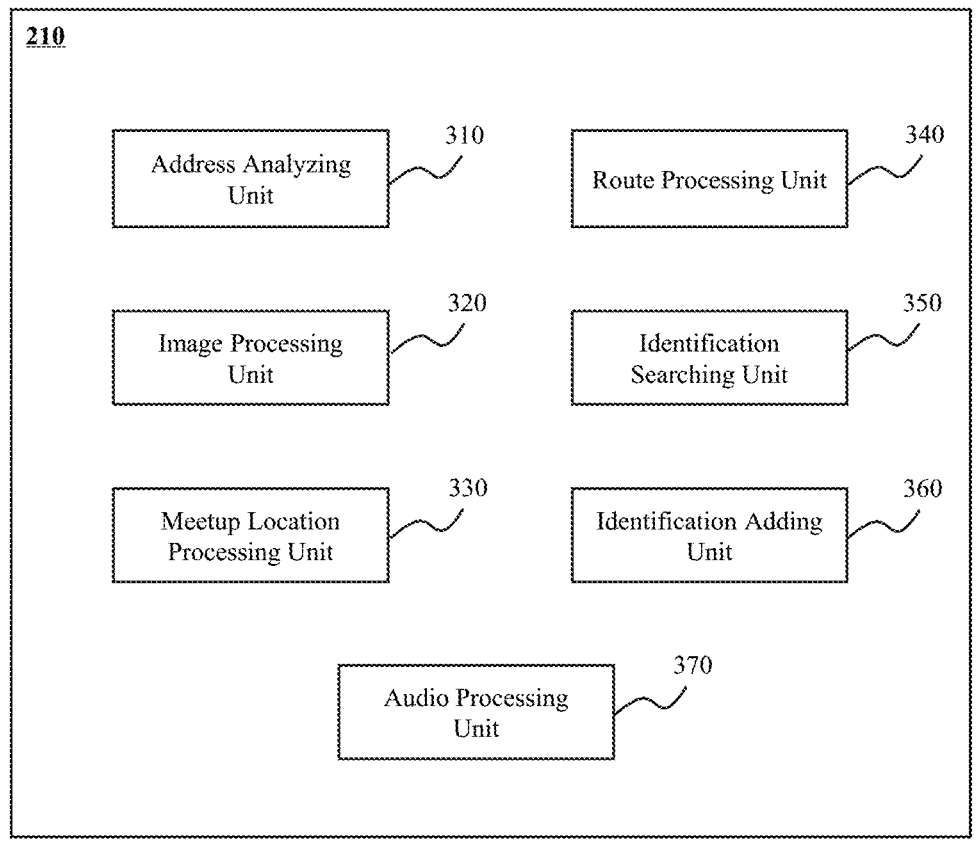
FIG. 3 is a schematic diagram of a processing module of a positioning engine according to some embodiments of the present disclosure.

FIG. 3 is a schematic block diagram illustrating the processing module 210 of the positioning engine 110 according to some embodiments of the present disclosure. The processing module 110 may include an address analyzing unit 310, an image processing unit 320, a meetup location processing unit 330, a route processing unit 340, an identification searching unit 350, an identification adding unit 360, and an audio processing unit 370. In addition, the processing module 210 may also include other units.

The address analyzing unit 310 may be configured to process address information. The methods of processing the address information may include analysis and/or reverse analysis of the address information. Reverse analysis may include converting address coordinates into text information of a location corresponding to the address coordinates. Analysis may include converting text information of a location into address coordinates. The address coordinates may be, for example, longitude-latitude coordinates. The text information may be one or more of iconic and representative names of a location, such as a common name, a street number, a name of a landmark of the location, etc. The address analyzing unit 310 may also send the processed address information to other units, such as the route processing unit 340, the identification searching unit 350, the image processing unit 320, the meetup location processing unit 330, the audio processing unit 370, or the like.

The image processing unit 320 may be used to process image data (e.g., still images, video, etc.) to obtain processed image information. The image data may be processed using one or more image processing methods such as image enhancement, image recognition, image segmentation, image measurement (e.g., calculation of angles, distances, and perspective relations), or the like, or any combination thereof. The image information identified by the image processing unit 320 may be inputted into the address analyzing unit 310 for search for corresponding address information. The image processing unit 320 may also obtain information from other units, e.g., the identification searching unit 350.

The meetup location processing unit 330 may be used to calculate and identify one or more locations for a passenger and a driver to meet according to the address information provided by the passenger terminal 120 and/or the driver terminal 140, and process feedback information from the passenger terminal 120 and/or the driver terminal 140 about the selection, exclusion or evaluation of meetup locations in order to filter a meetup location. The meetup location processing unit 330 may calculate a meetup location based on the address information analyzed or reversely analyzed by the address analyzing unit 310. The meetup location processing unit 330 may also send the obtained meetup location to the route processing unit 340.

The route processing unit 340 may calculate and plan a travel route for the passenger and a driving route for the driver (e.g., a route from the driver's location to the passenger's location) based on the positioning information provided by the passenger terminal device 120 and the driver terminal device 140. The route processing unit 340 may plan a route for the driver based on meetup location information obtained from the meetup location processing unit 330. In some embodiments, the route processing unit 340 may use the identifications found by the identification searching unit 350 to plan routes. The identification searching unit 350 may be used to search geographic identifications near a location. The identification adding unit 360 may be used to add an identification for geographic location information. The audio processing unit 370 may be used to process audio information obtained from the passenger terminal device 120 or the driver terminal device 140. The audio information may be processed using one or more audio processing methods, such as noise reduction, voice recognition, semantic recognition, character recognition, or the like. The audio processing unit 370 may send the identified audio information to other units for processing, for example, the identified address information may be sent to the address analyzing unit 310.

Operations and/or processes performed by each sub-unit 310-370 of the processing module 210 may include operations based on logics such as logic operation (e.g., an "AND" operation, an "OR" operation, a "NOT" operation) or operations based on numerical values. Each sub-unit 310-370 of the processing module 210 may include one or more processors. The processor may be any general processor such as a programmed Programmable Logic Device (PLD), an Application Specific Integrated Circuit (ASIC), a microprocessor, a System on Chip (SoC), or the like. The processor may also be a Digital Signal Processor (DSP), or the like. Two or more of the sub-units 310-370 may be integrated in a single hardware device, or two or more hardware devices which are independent from each other. It should be understood that the sub-units 310-370 of the processing module 210 can be implemented in multiple ways. For example, in some embodiments, the system may be implemented by hardware, software or any combination thereof. The system may be implemented by very large scale integrated circuits or gate arrays, semiconductor devices such as logic chips, transistors, or hardware circuits of programmable hardware devices such as field programmable gate arrays, programmable logic devices. The system may also be implemented by software executed in various types of processors, or a combination of the above hardware circuits and software (e.g., firmware).

Figure 4:
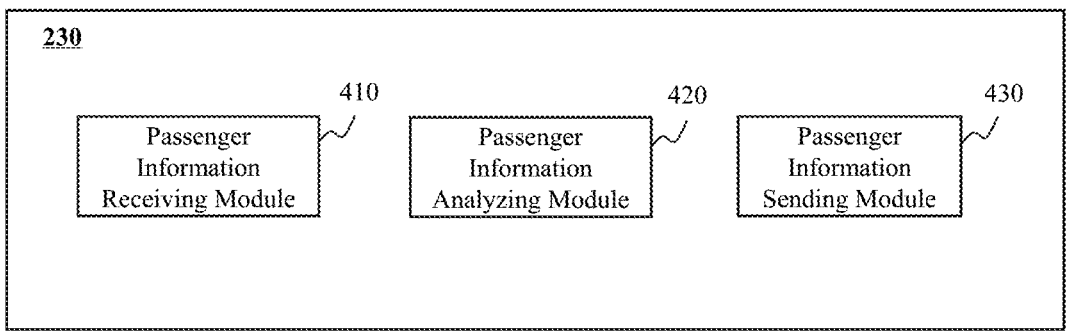
FIG. 4 is a schematic diagram of a passenger interface of a positioning engine according to some embodiments of the present disclosure.

FIG. 4 is a schematic block diagram of the passenger interface 230 of the positioning engine 110 according to some embodiments of the present disclosure. The passenger interface 230 may include a passenger information receiving unit 410, a passenger information analyzing unit 420 and a passenger information sending unit 430. The passenger information receiving unit 410 may receive information sent by a passenger, and may recognize, arrange and classify the information. The content of the information sent by the passenger may relate to the current location of the passenger determined using a positioning technology, a current location or pickup location inputted by the passenger, the selection/requirement/description information of the passenger regarding the service, the content/format/time/amount of the information that the passenger expects to receive, or the like, or any combination thereof. The content of the types of information sent by the passenger may relate to natural language text information inputted by the passenger on a device, binary information sent by the passenger by a device, audio information (including one or more voice inputs of the passenger) recorded by the I/O module 620 of the passenger terminal device 120, image information (including still images or videos) shot by the I/O module 620 of the passenger terminal device 120, or the like, or any combination thereof. The passenger may provide the information to the passenger information receiving unit 410 of the passenger interface 230 via the network 150. The passenger information analyzing unit 420 may be used to analyze the passenger information received by the passenger information receiving unit 410. The analysis may include arranging or classifying the passenger information in order to convert the content of the passenger information into a format that can be calculated, processed or stored by the processing module 210 or the storage module 220. The passenger information analyzing unit 420 may also be used to convert the format of information processed by the processing module 210 or stored in the storage module 220 into a format that can be accessed or selected by the passenger based on the instructions or preferences of the passenger. The passenger information analyzing unit 420 may provide the format-converted information to the passenger information sending unit 430. The passenger information sending unit 430 may be used to send required information to the passenger by the positioning engine 110 to the passenger via the network 150. The passenger information receiving unit 410 may include a wired or a wireless receiving device. The receiving device may connect to the passenger terminal device 120 via the network 150. Similarly, the passenger information sending unit 430 may include a wired or a wireless sending device. The sending device may connect to the passenger terminal device 120 via the network 150.

Figure 5:
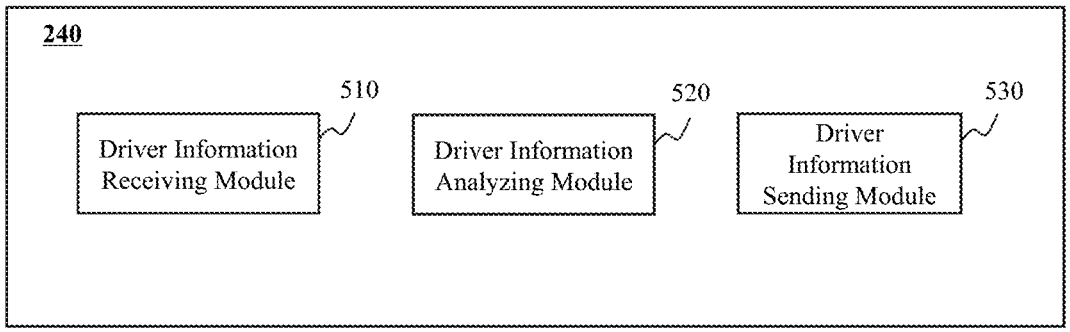
FIG. 5 is a schematic diagram of a driver interface of a positioning engine according to some embodiments of the present disclosure.

FIG. 5 is a schematic block diagram of the driver interface 240 of the positioning engine 110 according to some embodiments of the present disclosure. As shown in FIG. 5, the driver interface 240 may include a driver information receiving unit 510, a driver information analyzing unit 520 and a driver information sending unit 530. The driver information receiving unit 510 may obtain information sent by a driver through the driver's device, and may recognize, arrange and classify the information. The content of the information sent by the driver may relate to the current location of the driver determined using a positioning technology. The content of information may also relate to the driving speed, the current service condition (e.g., occupied, waiting to carry passengers, idle driving (e.g., driving without a passenger)) returned by the driver, the selection/confirmation/rejection information of the driver with respect to the service request, or the like, or any combination thereof. The content of the types of information sent by the driver may relate to text information in natural language and may be inputted by the driver in a device. The information sent may also be binary information sent by the driver in a device, audio information (including one or more voice inputs of the driver) recorded by the driver terminal device 140, image information (including still images or videos) obtained by the driver terminal device 140, or the like, or any combination thereof. The driver may send the information to the driver information receiving unit 510 of the driver interface 240 via the network 150. The driver information analyzing unit 520 may be used to analyze the driver information received by the driver information receiving unit 510. The analysis may include arranging or classifying the driver information in order to convert the format of the information into a format that can be calculated, processed or stored by the processing module 210 or the storage module 220. The driver information analyzing unit 520 may also be used to convert the format of the information processed by the processing module 210 or stored in the storage module 220 into an information format that can be accessed or selected by the passenger based on the instructions or preferences of the driver. The driver information analyzing unit 520 may provide the format-converted information to the driver information sending unit 530. The driver information sending unit 530 may be used to send required information to the driver by the positioning engine 110 via the network 150. The driver information receiving unit 510 may include a wired or wireless receiving device. The receiving device may connect to the driver terminal device 140 via the network 150. Similarly, the driver information sending unit 530 may include a wired or wireless sending device. The sending device may connect to the driver terminal device 140 via the network 150.

Figure 6:
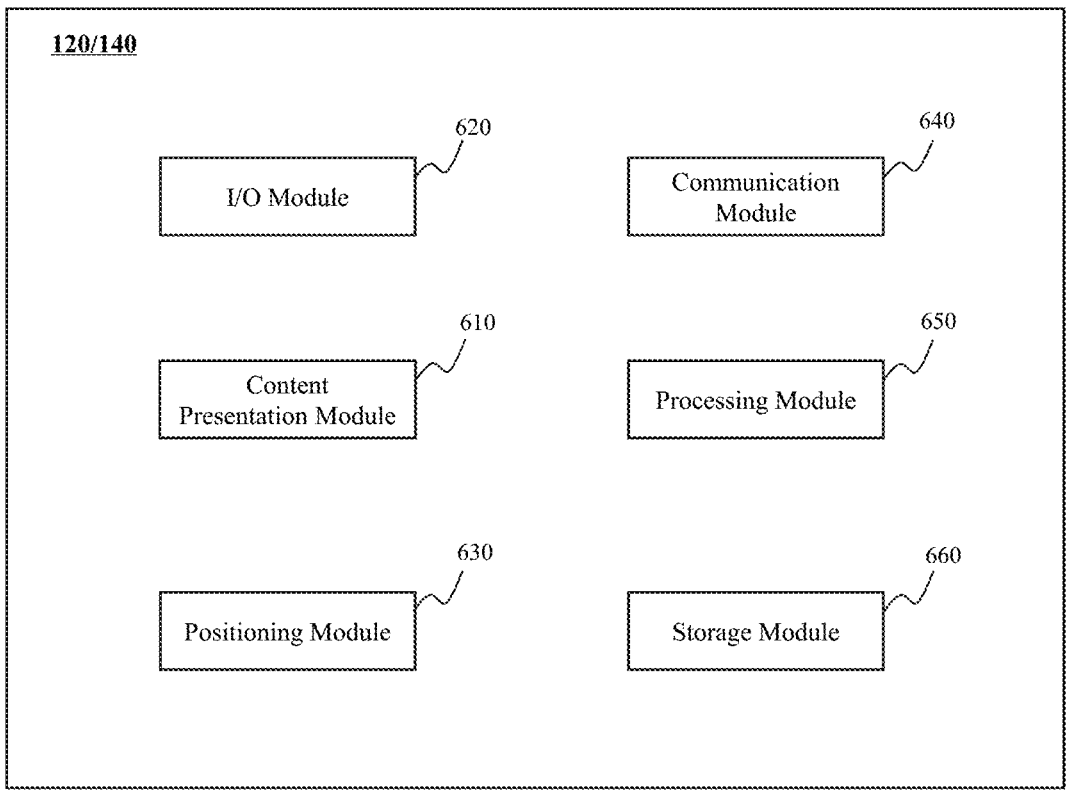
FIG. 6 is a schematic diagram of a user terminal device according to some embodiments of the present disclosure.

In some embodiments, FIG. 6 is a block diagram of the passenger terminal device 120 and the driver terminal device 140. Taking the passenger terminal device 120 as an example, the passenger terminal device 120, as shown in FIG. 6, may include a content presentation module 610, an I/O module 620, a positioning module 630, a communication module 640, a processing module 650 and a storage module 660. The content presentation module 610 may be used to display a graphical interface, a map interface and an I/O operating interface of the on-demand service application. The I/O module 620 may be used to obtain one or more types of inputs that the passenger inputs into the graphical interface, the map interface and the I/O operating interface of the on-demand service application, and output the information that is waiting to be provided to the user in one or more types. The I/O module 620 may also be used to collect and record one or more types of information such as optical and acoustic of the user or the outside (e.g., the surrounding environment) in the form of still images, video, audio, etc., by a method such as signal conversion. The input and/or output may be in the form of acoustic signals, optical signals, mechanical vibration signals, or the like, or any combination thereof. The positioning module 630 may be used to determine the location and/or motion status of the user based on one or more positioning technologies/distance measuring technologies. More particularly, the determination of the location and/or motion status of the user may include calculating one or more motion parameters of the user, such as the location, a speed, an acceleration, an angular velocity, a route, or the like. The communication module 640 may be used to send or receive the information that is waiting to be sent or received by the passenger terminal device 120 by a wired or wireless communication. For example, the communication module 640 may communicate with the passenger interface 230 of the positioning engine 110, so that the passenger terminal device 120 may send information to the positioning engine 110 or receive information from the positioning engine 110. In some embodiments, the passenger terminal device 120 may communicate with the driver terminal device 140 via the communication module 640. For example, the passenger terminal device 120 and the driver terminal device 140 may communicate with each other through Bluetooth® communication. A distance between the driver terminal device 140 and the passenger terminal device 120 may be directly measured when the Bluetooth® of both devices are turned on. The processing module 650 may be used to calculate and process information obtained by the passenger terminal device 120. The storage module 660 may be used to store information that is obtained, generated, calculated or processed by the I/O module 620, the positioning module 630 or the processing module 650.

The above description of the passenger terminal device 120 may be applicable to the driver terminal device 140.

It should be noted that the above description of the user terminal device 120 or 140 is provided for the purposes of illustration, and not intended to limit the scope of the present disclosure. For persons having ordinary skills in the art, modules may be combined in various ways, or connect with other modules as sub-systems and various variations and modifications may be conducted under the teaching of the present disclosure. However, those variations and modifications may not depart the spirit and scope of this disclosure. For example, the content presentation module 610 and the I/O module 620 may be different modules in a system, or a single module capable of achieving the functions of both modules. All such modifications are within the protection scope of the present disclosure.

Figure 7:
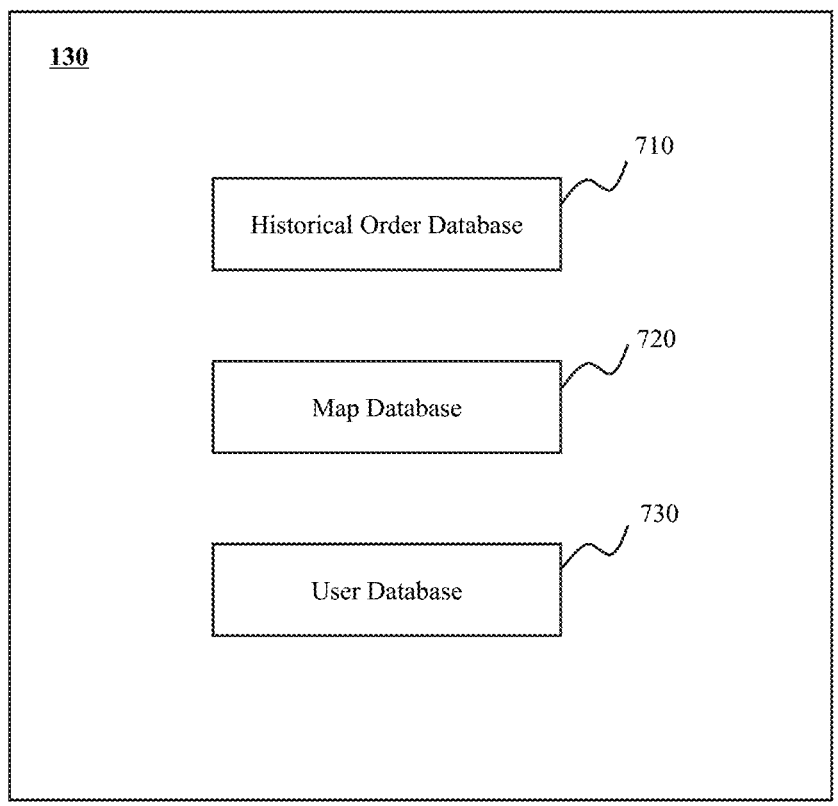
FIG. 7 is a schematic diagram of a database according to some embodiments of the present disclosure.

FIG. 7 is a schematic diagram of the database 130. The database 130 may store various information with multiple contents. The database 130 may include a historical order database 710, a map database 720, a user database 730, or the like. When the positioning engine 110 or other modules or units need one or more types of information, the information may be extracted from the database 130. The historical order database 710 may include the starting location of a historical order, the meetup location of a passenger and a driver, travel history, price of an order service, tip of an order service, travel time of an order, average travel speed, evaluation of a historical order made by a passenger and/or a driver, or the like. The map database 720 may include geographic coordinates of artificial objects such as streets, bridges, buildings and other man-made objects, geographic coordinates of rivers, mountains, forests, wetlands and other natural features, descriptive names or identifications of the above objects (e.g., the number of a street, a mansion, a river, a store, etc.), image information of the above objects, or the like. Information stored in the user database 730 may include information that is related to services of the user 120 or 140, such as a name of an account, a display name (e.g., a nickname), a documentation number (e.g., a driver license, an ID card, etc.), a registration date, a user level/priority, a credit record, a home address, a business location, vehicle information, or the like. Different modules or components of a database 130 may store the above information. Multiple databases 130 may store the above information, and the multiple databases can exchange information with each other by a wired or wireless communication.

Figure 8:
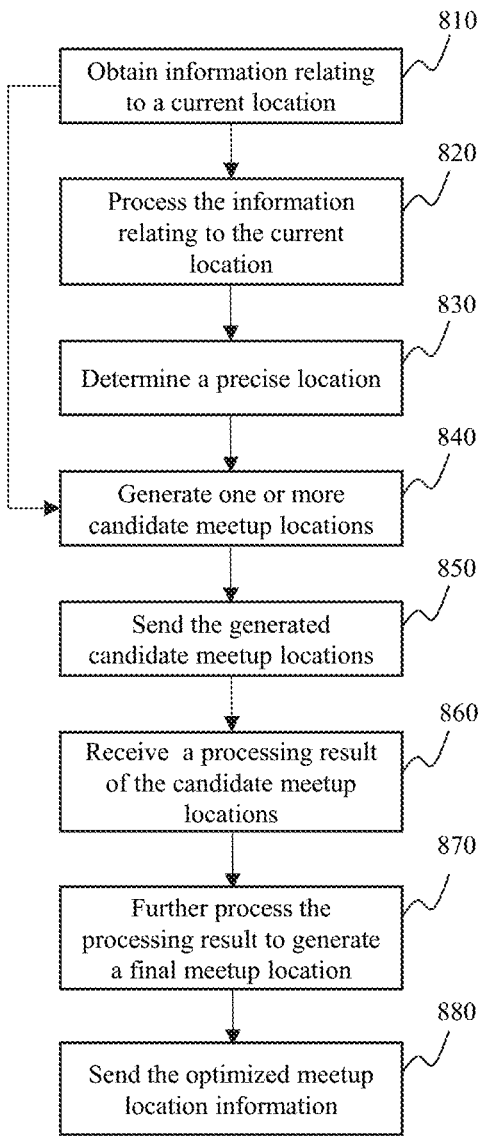
FIG. 8 is a flow chart of an exemplary process for determining a precise location and a meetup location according to some embodiments of the present disclosure.

FIG. 8 is a flow chart of an exemplary process for determining a precise location of a passenger and a meetup location according to some embodiments of the present disclosure. It should be noted that the precise location may include a result generated by modifying and eliminating errors in positioning information. The positioning information may be obtained by a positioning device or module. In some embodiments, the precise location may include other ways of expression of the positioning information. For example, if the location inputted by a passenger is "No. 3 Haidian Street", the positioning engine 110 may generate a name "Dinghao mansion" that may be more easily to be understood by the driver. In other embodiments of the present disclosure, "optimized location information" may be regarded as another way of expressing precise location.

As shown in FIG. 8, in step 810, the positioning engine 110 may obtain information relating to a current location. Step 810 may be implemented by the passenger interface 230 and/or the driver interface 240. In some embodiments, the information relating to the current location may be obtained from the passenger terminal device 120, the driver terminal device 140, the database 130, and/or the information source 160. The information relating to the current location may include but is not limited to a current location of a passenger, a current location of a driver, a departure location of a service, and/or a destination of the service. The current location of the passenger and/or the current location of the driver may be acquired by the positioning module 630 of the passenger terminal device 120, the driver terminal device 140, or the I/O module 620. The current location of the passenger and/or the current location of the driver may be location coordinates of the passenger and the driver obtained using one or more positioning technologies (e.g., the Global Positioning System (GPS)). The current location of the passenger and/or the current location of the driver may also be inputted by the passenger or the driver. In some embodiments, the information relating to the current location described above may include other information about the surrounding areas of the current location of the passenger and/or the driver. The other information about the surrounding areas may relate to a business district, a residential area, a scenery, a hospital, a school, a big building, a bus station, a railway station, a metro station, an airport, a bridge, a crossroads, or the like, or any combination thereof. In some embodiments, the information relating to the current location may include images, videos, audios, or the like relating to the surrounding areas of the current location. The information may be uploaded by the passenger terminal device 120 and/or the driver terminal device 140. The images, videos, and/or audios may be obtained by the I/O module 620. For example, a passenger may take photos of landmark buildings in the surrounding areas of his/her current location using a cellphone and may upload the photos to the positioning engine 110. As another example, a passenger may generate a voice message or a video about the situation of surrounding areas of his/her current location and send the voice or the video to the positioning engine 110.

In step 820, after the positioning engine 110 obtains the information relating to the current location, the positioning engine 110 may process the information relating to the current location. Step 820 may be completed by the processing module 210 of the positioning engine 110. For example, in some embodiments, the positioning engine 110 may determine a precise location of a passenger by the address analyzing unit 310 and the image processing unit 320 of the processing module 210. The determination may be made based on the current location of the passenger (e.g., a location obtained by GPS) and the photos of the surrounding landmark buildings uploaded by the passenger (in step 830). The current location of the passenger may be analyzed by the address analyzing unit 310. The image processing unit 320 may identify one or more names of the landmark buildings. The image processing unit 320 can then conduct a search using the database 130 based on the name of the landmark buildings to obtain positioning information of the landmark buildings. In some embodiments, the positioning engine 110 may receive a video or an audio about the current location of a passenger. Information included in the video or the audio (e.g., information relating to the current location of a passenger) may be obtained by analyzing the video and the audio. The analysis of the video and the audio may be performed by the image processing unit 320 and/or the audio processing unit 370 of the processing unit 210. In addition, in some embodiments, the processing of the information relating to the current location by the processing unit 210 may include obtaining other information relating to the current location by directly searching the database 130 or the storage module 220 based on the current location of the passenger. In some embodiments, the processing module 210 may directly obtain information relating to the current location based on the current location of the passenger. For example, after obtaining one or more coordinates of the current location of the passenger, the positioning engine 110 may obtain the name of a landmark building relating to or in proximity to the coordinates of the current location of the passenger by searching the database 130.

In step 830, the precise location may be determined by the positioning engine 110 based on the processing result of the information relating to the current location. For example, in some embodiments, the precise location of a passenger may be determined by the processing module 210 of the positioning engine 110 based on the current location of the passenger and the analyzed other information relating to the current location such as the name or the location of a landmark building.

It should be noted that the above description is provided for the purposes of illustration and not intended to limit the scope of the present disclosure. For persons having ordinary skills in the art, various variations and modifications of positioning precise locations may be conducted under the teaching of the present disclosure. However, those variations and modifications may not depart the spirit and scope of this disclosure. In some embodiments, some steps may be added or omitted. For example, the positioning engine 110 may directly obtain the precise location of a passenger or a driver without performing steps 810 and/or step 820. For example, a passenger may directly scan a quick response code on some buildings such as a shopping mall or an office building. The quick response code may directly imply the precise location of a passenger. The positioning engine 110 may directly receive the quick response code sent by the passenger. All such variations and modifications are within the protection scope of the present disclosure.

In some embodiments, the current location of a passenger is the location that the passenger gets on a car. Thus, the passenger may provide his/her current location as the starting location of an order. It should be noted that the location where the passenger gets on a car may be the meetup location of the passenger and the driver of the car. In some embodiments, the driver may receive the order and directly drive to the location. In other words, the current location of the passenger is the final meetup location of the driver and the passenger. In some embodiments, the current location of the passenger may not be the meetup location of the driver and the passenger. For example, the current location of the passenger may be somewhere inside a shopping mall, and the meetup location of the driver and the passenger may be an exit of the shopping mall or other places near the shopping mall. Thus, it is necessary to determine the meetup location of the driver and the passenger.

In step 840, the positioning engine 110 may generate one or more candidate meetup locations. In some embodiments, when the passenger selects a starting location of an order, one or more options may be provided to the passenger by the positioning engine 110. The options may be the current location of the passenger, or other locations near the current location of the passenger. The options may be stored in the positioning engine 110 or obtained from the database 130 or the information source 160. Besides, the options may be generated based on the order after the passenger inputs the starting location of the order. In some embodiments, the positioning engine 110 may store one or more meetup locations relating to a location. The positioning engine 110 may store one or more meetup locations relating to the location and the passenger. After the starting location of the order is determined, the positioning engine 110 may directly extract one or more meetup locations relating to the location and/or the passenger. Then the positioning engine 110 may send the extracted meetup locations to the passenger terminal device 120 and/or the driver terminal device 140. In some embodiments, after receiving the starting location of the order, the positioning engine 110 may consider some additional information, such as road conditions, weather conditions, time, or the like, or any combination thereof, to generate some recommendation results of the meetup location that is easy for the passenger and the driver to meet with each other. The additional information may include whether the order is in rush hours, whether there is an event (e.g., a big game) near the inputted starting location and within the inputted time period of the order, whether the road is in maintenance or closed, whether the public traffic is in normal operation, or the like, or any combination thereof. In some embodiments, the positioning engine 110 may generate one or more candidate meetup locations by combining the starting location and an ending location of the order (e.g., a destination of the order).

In step 850, the positioning engine 110 may send the generated candidate meetup locations to the passenger terminal device 120 and/or the driver terminal device 140. In some embodiments, some preset meetup locations stored in the system may be provided for the passenger and/or driver to choose. The passenger terminal device 120 and/or the driver terminal device 140 may process the preset meetup locations. The processing of the preset meetup locations may include but is not limited to directly receiving or selecting one of the preset meetup locations as a final meetup location, removing one or more of the preset meetup locations, returning the remaining preset meetup locations to the positioning engine 110, or the like.

In step 860, the positioning engine 110 may receive a processing result of the candidate meetup locations from the passenger terminal device 120 and/or the driver terminal device 140. In step 870 the processing result may be further processed by the positioning engine 110 to generate a final meetup location (e.g., an optimized meetup location). In some embodiments, the positioning engine 110 may evaluate the candidate meetup locations and determine a final meetup location based on the evaluation. The evaluation may be made based on a criterion and/or criteria such as distances between the candidate meetup locations and the current location of the passenger, road conditions around the candidate meetup locations, relative orientations between the candidate meetup locations and the destination of the passenger, or the like. In step 880, the positioning engine 110 may send the optimized meetup location information to the passenger terminal device 120 and/or the driver terminal device 140 for displaying the meetup locations.

Based on the meetup location, the current location of the driver, and the destination of a service, the route processing unit 340 of the positioning engine 110 may generate one or more routes from the current location of the driver to the meetup location and one or more routes from the meetup location to the ending location of an order (e.g., the destination of the service). The route generation described above may be based on a certain route planning algorithm, e.g., the shortest route planning algorithm. The shortest route planning algorithm may include Dijkstra algorithm, SPFA algorithm, Bellman-Ford algorithm, Johnson algorithm, Floyd-Warshall algorithm, or the like, or any combination thereof. The route planning algorithm may relate to factors such as road conditions, weather conditions, time, or the like, or any combination thereof. For example, the factors may include rush hours, a location of a big game or event, road maintenance or closure condition, whether the public traffic is in normal operation, or the like, or any combination thereof may be considered. The positioning engine 110 may send the routes to the passenger terminal device 120 and/or the driver terminal device 140 via the passenger interface 230 and/or the driver interface 240. The passenger terminal device 120 and/or the driver terminal device 140 may display the routes.

According to the meetup location and the current location of the driver, the processing module 210 of the positioning engine 210 may calculate distance between the current location of the driver and the meetup location. The calculation may be made by a calculating unit (not shown in FIG. 3) of the processing module 210. The distance between the current location of the driver and the meetup location may include a straight-line distance, a road distance, a travel distance, or the like. Method of measuring the distance may be similar to the distance measuring methods described elsewhere in the present disclosure and are not further described here. The positioning engine 110 may send the distance to the passenger terminal device 120 and/or the driver terminal device 140 through the passenger interface 230 and/or the driver interface 240 via the network 150. The passenger terminal device 120 and/or the driver terminal device 140 may display the distance information.

It should be noted that the above description of determining the precise location and the meetup location is merely illustrative, and not intended to limit the scope of present disclosure. For persons having ordinary skills in the art, various variations and modifications of determining the precise location and the meetup location may be conducted under the teaching of the present disclosure. However, those variations and modifications may not depart the spirit and scope of this disclosure.

Figure 9:
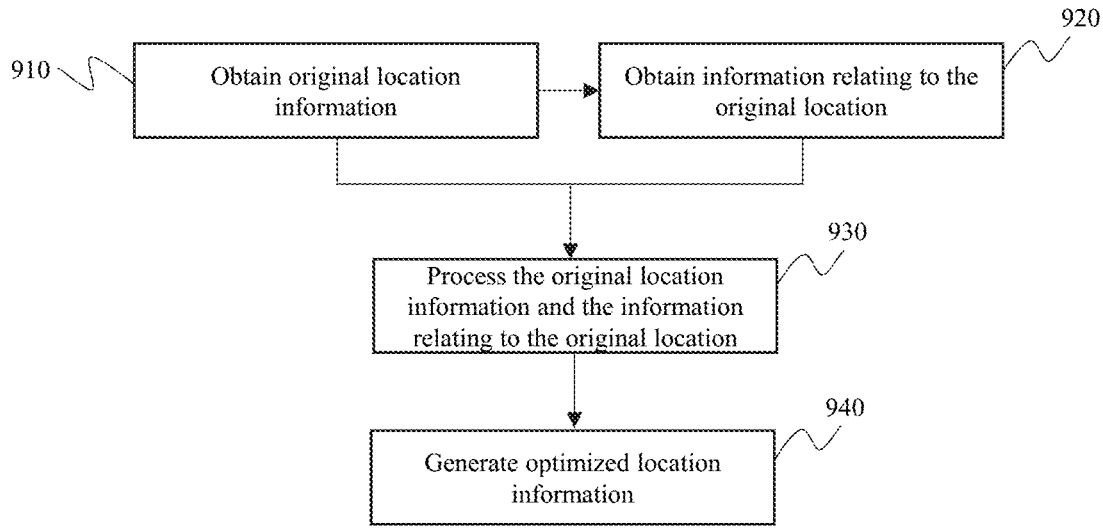
FIG. 9 is a flow chart of an exemplary process for generating optimized location information according to some embodiments of the present disclosure.

FIG. 9 is a flow chart of an exemplary process for generating optimized location information by the positioning engine 110 according to some embodiments of the present disclosure. In step 910, the positioning engine 110 may obtain original location information from the passenger terminal device 120. The original location information may be geographic coordinate information related to the location of the passenger terminal device 120 obtained by the positioning module 630 of the passenger terminal device 120. For example, the geographic coordinate information may be longitude-latitude coordinates, an altitude, or the like. The positioning module 630 may obtain information of the passenger using one or more positioning technologies. The information of the passenger may include a current location, a motion state, a speed, or the like. The one or more positioning technologies may be selected from Global Positioning System (GPS) technology, Global Navigation Satellite System (GLONASS) technology, Beidou navigation system technology, Galileo positioning system (Galileo) technology, Quasi-Zenith Satellite System (QAZZ) technology, base station positioning technology, Wi-Fi positioning technology, various positioning and speed measuring technologies installed on vehicles, or the like. Because of the inner measurement error of the positioning module 630 and the limitation of precision of the positioning technologies, the original location information may not be precise, and may not meet the requirement of a precise service.

For example, basic positioning information of the current location may be obtained using a Wi-Fi positioning technology. A wireless router may have a globally unique Media Access Control (MAC) address. Generally, the wireless router may not move in a period of time. Once the Wi-Fi function of the passenger terminal device 120 is turned on, the passenger terminal device 120 may scan and collect signals of nearby routers to obtain MAC addresses broadcasted by the routers. The passenger terminal device 120 may send data (including the MAC addresses) to the positioning engine 110. The data may represent the routers. The positioning engine 110 may search the geographic locations of the routers in the database 130 based on the received data. Then the positioning engine 110 may calculate the location of the passenger terminal device 120 based on the strength of the obtained signals of different routers. The strength of the signals of different routers may be provided by the passenger terminal device.

Alternatively, basic positioning information of the current location may be obtained using a base station positioning technology. The communication module 640 of the passenger terminal device 120 may measure downlink pilot signals of different base stations and obtain Time of Arrival (TOA) or Time Difference of Arrival (TDOA) of the downlink pilot signals of different base stations. The measured signals may be sent to the positioning engine 110 by the passenger terminal device 120 via the network 150. According to the measured results and the coordinates of the base stations, the processing module 210 of the positioning engine 110 may calculate the original location information of the passenger terminal device 120. In some embodiments, the processing module 210 may calculate the original location information using trigonometry.

Upon or after obtaining the original location information of the passenger terminal device 120, the positioning engine 110 may obtain the information relating to the original location from the storage module 220, the database 130, and other information sources 160 in step 920. The positioning engine 110 may obtain the information relating to the original location via the network 150. According to some embodiments of the present disclosure, the information relating to the original location may be image information received from the passenger terminal device 120. The image information may include still image information and/or video information.

According to some embodiments of the present disclosure, the information relating to the original location may include a picture or video of a building or a signpost with a particular identification. For example, the information relating to the original location may be one or more pictures or videos of a building near the current location with a particular identification. The information relating to the original location may also be multiple pictures or videos of multiple buildings near the current location.

According to some embodiments of the present disclosure, the information relating to the original location may be the identification information that may be searched by the identification searching unit 350 of the processing module 210 in the map database 720 of the database 130 near the original location. The identification searching unit 350 may search identifications near the original location in the map database 720. According to some embodiments, the identification searching unit 350 may search identifications in a preset range from the original location.

In step 930, the positioning engine 110 may process the original location information and the information relating to the original location obtained in step 910 and step 920. In some embodiments, step 930 may include identifying a building name from a picture or a video of the building based on a particular identification of the building. For example, after the positioning engine 110 obtains the picture or the video of the building, the image processing unit 320 of the processing module 210 may identify the basic features (or identifications) of the building using image recognition technology. The positioning engine 110 may retrieve information stored in the map database 720 of the database 130 and search image information of buildings. Then a building with matching features may be identified and geographic location information corresponding to the building may be obtained. According to some embodiments of the present disclosure, if the positioning engine 110 finds multiple buildings that match the features in the still image or video using an image recognition technology, B1, B2, . . . Bn (n≥1) may be used to mark the name of the multiple buildings recognized in the map database 720 of the database 130. According to some embodiments of the present disclosure, the image processing unit 320 of the processing module 210 of the positioning engine 110 may calculate information (including a distance between a location where the image is captured and a building in a picture/video, an angle of capturing the image and the direction of capturing the image, or the like) using an image measuring technology.

In step 940, the processing module 210 may generate optimized location information based on the processed information of the original location and information relating to the original location. According to some embodiments of the present disclosure, the processing module 210 may obtain precise location information of the location where the image is captured and generate optimized location information based on the information of the original location and image information after the image recognition and/or the image measuring. By processing information related to the original location in step 930, the processing module 210 may identify a building in an image. Also, the processing module 210 may obtain positioning information of the building by searching in the map database 720 of the database 130. For example, based on recognized building names B1, B2, . . . Bn (n≥1), geographic coordinates (P1, P2, . . . Pn) (n≥1) of the buildings may be obtained by searching the address information database. For example, assuming that original positioning information of a current location is P0 and obtained positioning information of buildings is P1, P2, . . . Pn (n≥1), distances D01, D02, . . . D0n between P0 and P1, P2, . . . Pn (n≥1) may be calculated respectively. By ranking D01, D02, . . . D0n from the smallest to the largest, the smallest value D0x may be found. D0x may correspond to the positioning information (Px) of a building that is in closest proximity to the current location. Px may be designated as the precise positioning information of the current location.

In some embodiments, according to the distance between the location where the image is captured and a building in a picture/video, an angle of capturing the image and the direction of capturing the image, or the like obtained in step 930, the image processing unit 320 of the processing module 210 may calculate the distance between the location where the image is captured and the building. Then the processing module 210 may calculate precise geographic coordinates of the location where the image is captured and generate optimized location information by combining the distance and the precise geographic coordinate of the building in the database 130. In some embodiments, the positioning engine 110 may generate optimized location information by adding searched identifications into the original location information by the identification adding unit 360 of the processing module 210.

Based on the meetup location, the current location of the passenger and the ending location of an order (e.g., the destination of the service) described above, the route processing unit 340 of the positioning engine 110 may generate one or more routes from the current location of the driver to the meetup location, and one or more routes from the meetup location to the ending location of an order. The route planning methods and designing factors thereof may be found elsewhere in the present disclosure, and will not be further described here. The positioning engine 110 may send the routes to the passenger terminal device 120 and/or the driver terminal device 140 via the passenger interface 230 and/or the driver interface 240. The routes may be displayed on the passenger terminal device 120 and/or the driver terminal device 140.

It should be noted that the above description of generating the optimized location information is merely illustrative, and not intended to limit the scope of present disclosure. For persons having ordinary skills in the art, various variations and modifications of generating the optimized location information may be conducted under the teaching of the present disclosure. However, those variations and modifications may not depart the spirit and scope of this disclosure. In some embodiments, some steps such as step 920 in FIG. 9 described above may be omitted. The positioning engine 110 may directly obtain the optimized location information based on the original location information obtained in step 910 without performing step 920.

Figure 10:
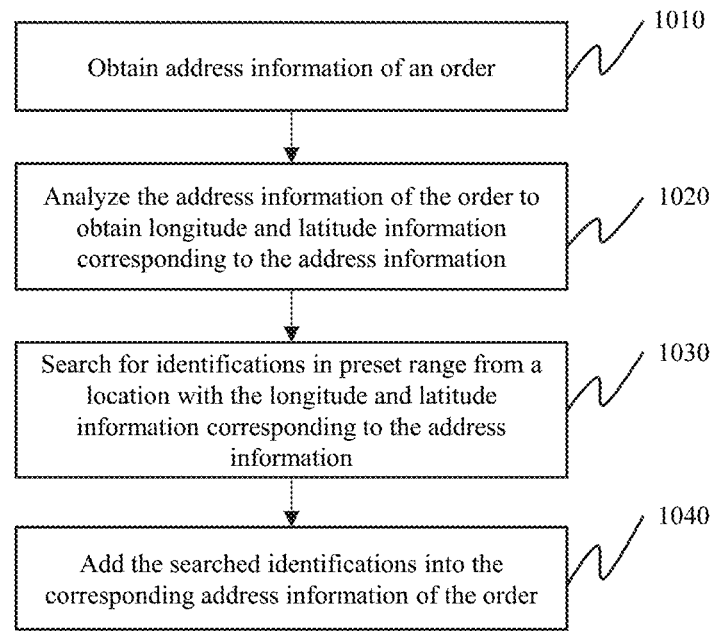
FIG. 10 is a flow chart of an exemplary process for generating optimized location information according to some embodiments of the present disclosure.

FIG. 10 is a flow chart of an exemplary process for generating optimized location information according to some embodiments of the present disclosure. When a passenger confirms a car-hailing order, the starting location of the order be selected. The selection may be made by manually inputting or choosing a current location, a location of getting on a car or a destination. The selection may also be made by directly localizing the starting location and the ending location of the order using positioning technologies such as GPS. In step 1010, the address information of the order may be obtained by the positioning engine 110. The process of acquiring the order information may be completed by the passenger interface 230. When the passenger provides or chooses the current location, a meetup location, or the destination, the address information of the order may be analyzed by the positioning engine 110. The address information may include a starting address and/or a destination address, or the like. For example, the starting address and the destination address may be the starting location and ending location of the order. The process of analyzing the address information of the order may be completed by the address analyzing unit 310 of the processing module 210. In step 1020, longitude and latitude information corresponding to the address information may be obtained by analyzing the address information.

In step 1030, the positioning engine 110 may search for identifications in a preset range from a location with the longitude and latitude corresponding to the address information. The search for the identifications may be performed by the identification searching unit 350 of the processing module 210. The preset range may be set as needed. For example, the range may be set greater than, equal to, or less than 500 meters. In some embodiments, the preset range may be 1 to 200 meters, 200 to 300 meters, 300 to 400 meters, or 400 to 500 meters. In some embodiments, the preset range may be 1 to 50 meters, 50 to 100 meters, 100 to 150 meters, or 150 to 200 meters. In some embodiments, the preset range may be 10 meters, 20 meters, 30 meters, 40 meters, 50 meters, 60 meters, 70 meters, 80 meters, 90 meters, 100 meters, or the like. In some embodiments, the setting of the preset range may be determined based on the location corresponding to the longitude and latitude information. For example, different locations may have different preset ranges.

The identifications may be business districts, residential areas, sceneries, hospitals, schools, big buildings, bus stations, railway stations, metro stations, airports, bridges, crossroads, or the like, or any combination thereof. In some embodiments, the search for the identifications may be based on a sequence of priority levels. For example, each identification may correspond to a priority level. In some embodiments, for example, a business district may correspond to the highest priority. Bridges or crossroads may correspond to the second highest priority. Roads may correspond to the third highest priority. If a business district is found during the search, other identifications may no longer be searched, or search results including other identifications may be omitted. The found business district may be designated as the identification. If the business district is not found, a bridge or a crossroad within the preset range from the longitude and latitude of the address information may be searched. If the bridge or crossroad is found during the search, it may be designated as the identification. If the bridge or crossroad is not found, a road within the preset range may be searched. If a road is found during the search, it may be designated as the identification. It should be noted that the above description of priority levels used in the searches of the identifications is merely illustrative and not intended to limit the scope of protection of the present disclosure.

A search sequence (e.g., an order in which searches for the features are conducted) may be preset by the positioning engine 110, a user, the map used by the positioning engine 110 or a user, or any combination thereof. For example, a search sequence set by the user may have the highest priority. A search sequence set by the map may have the second highest priority. A search sequence set by the positioning engine 110 may have the lowest priority. The search sequence set by the positioning engine 110 may be automatically updated based on historical data. For example, the search sequence set by the positioning engine 110 may be updated based on factors such as the number or frequency of accepting or rejecting the recommended identifications. The search sequence may also be updated based on one or more other factors. The other factors may be a combination of a situation whether an identification is accepted or rejected and factors such as time, weather, or the like when the identification is accepted or rejected. The search sequence of the identifications may be selected based on factors such as time, weather, or the like. For example, a school may be preferably designated as an identification around the dismissal time. As another example, a business district may not be preferably designated as an identification in non-business hours.

The identifications relating to longitude and latitude may be stored in the on-demand service system 105 or the positioning engine 110 in advance. The identifications may also be generated based on an order after a passenger inputs the starting location of the order. In some embodiments, one or more identifications relating to a certain place may be stored in the on-demand service system 105 or the positioning engine 110. After determining the starting location of an order of a passenger, the positioning engine 110 may extract one or more identifications based on the above identification searching process and certain rules. In some embodiments, after obtaining the starting location of an order, the positioning engine 110 may collect geographic information within a preset range from the starting location and then obtain the identifications. The geographic information may include but is not limited to a surrounding building, a natural facility, a road, a bridge, or the like. The identifications and related information of identifications and the longitude and latitude may be obtained by the positioning engine 110. The related information and the preset range of the identifications and the longitude and latitude may be stored in the database 130, the storage module 220 of the positioning engine 110, or other units and modules with a storing function of the system.

In step 1040, the positioning engine 110 may add the searched identifications into the corresponding address information of an order. The process of adding the identifications may be implemented by the identification adding unit 360 of the processing module 210. The address information with the added identifications may be sent to the driver terminal device 140, and may be easily recognized by the driver. When the driver is accepting the order, it is easy to determine whether the car-hailing order is an expected one. This may avoid wasting order resources.

It should be noted that the above description of generating the optimized location information is merely illustrative, and not intended to limit the scope of present disclosure. For persons having ordinary skills in the art, various variations and modifications of generating the optimized location information may be conducted under the teaching of the present disclosure. However, those variations and modifications may not depart the spirit and scope of this disclosure. In some embodiments, some steps in the flow chart described above may be omitted. For example, if the address information of an order obtained by the positioning engine 110 from the passenger terminal device 120 is represented in the form of latitude and longitude information, step 1020 may be skipped and step 1030 may be directly performed. The positioning engine 110 may take the longitude and latitude information as a center and search identifications within a preset range from the center. In some embodiments, the address information represented in the form of address name may not be analyzed. The identifications in the preset range of the address name may be directly obtained.

Figure 11:
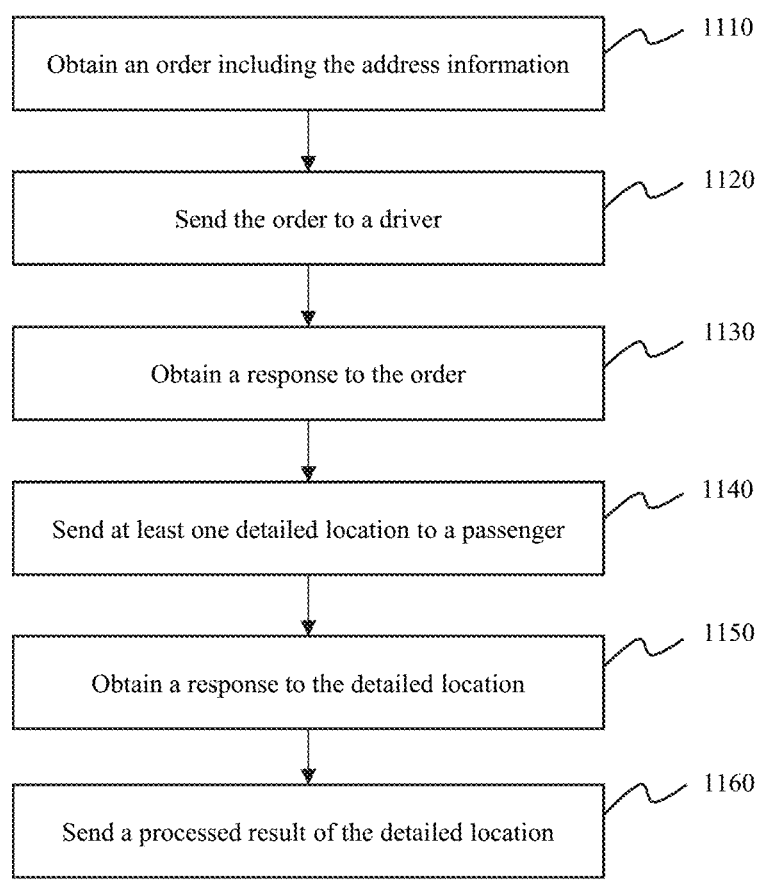
FIG. 11 is a flow chart of an exemplary process for generating optimized location information according to some embodiments of the present disclosure.

FIG. 11 is a flow chart of an exemplary process for generating optimized location information according to some embodiments of the present disclosure. In some embodiments, positioning devices or modules of the passenger terminal device 120 may obtain an approximate positioning location. A location customized and inputted by a passenger may not be precise as well. Therefore, in order to make a driver more easily identify the location, more precise location information or more detailed description of address information may be needed. In step 1110, the positioning engine 110 may obtain an order including the address information sent by a passenger. The order may be obtained by the passenger interface 230. The above address information may include but is not limited to a current location of the passenger, a departure location of the passenger, a destination of the passenger, or the like, or any combination thereof. In some embodiments, the current location of the passenger is the starting location of the passenger. Forms of the above address information may include text, image, audio, video, or the like, or any combination thereof.

After the positioning engine 110 receives the order of the passenger, in step 1120, the order may be sent to a driver terminal device 140. Next, in step 1130, the positioning engine 110 may obtain a response to the order from the driver terminal device 140. The driver interface 240 may send the order to the driver terminal device 140 and may obtain a response to the order from the driver terminal device 140. It should be noted that the positioning engine 110 may perform other processes before sending the order to the driver terminal device 140. For example, in some embodiments, the information obtained by the positioning engine 110 may be further processed. In some embodiments, the passenger analyzing unit 420 of the passenger interface 230 may analyze the order that is sent by the passenger and obtained by the passenger information receiving unit 410. The above analyzing operation may include arranging or classifying the passenger information (e.g., the order information sent by the passenger) so that the passenger information may be converted into a format that can be calculated, processed, or stored. In some embodiments, the order obtained by the positioning engine 110 may be in the form of audio. The audio processing unit 370 of the processing module 210 of the positioning engine 110 may analyze the audio of the order and generate order information in the form of text. The positioning engine 110 may send the order information to a driver by the driver interface 240. In some embodiments, an order obtained by the positioning engine may be in the form of text, video or image. The processing module 210 of the positioning engine 110 may convert the order into order information in the form of voice messages and send the order information to a driver.

In some embodiments, a response to an order made by a driver may include a requirement of the order such as a requirement of precise location information of the order. In some embodiments, an order sent to a driver by the positioning engine 110 may contain unclear information. Some smart positioning technologies can only obtain an approximate positioning location, but not a very precise location. For example, based on a certain positioning technology, the passenger terminal device 120 may be positioned to a certain market, but not to a particular location in the market. For example, a particular exit, floor, room may be difficult to be determined. Therefore, in some cases, it may be difficult for a driver to find a passenger only based on a simple address obtained after positioning. Thus, a more precise location is needed.

In step 1140, after obtaining a response of a driver to an order by the driver interface 240, the positioning engine 110 may send at least one detailed location to a passenger. The detailed location may be some location(s) within a preset range from the starting location of the order or the current location of the passenger as a center. The preset range may be less than, equal to, or greater than 100 meters. In some embodiments, the preset range may be set less than, equal to, or greater than 50 meters. In some embodiments, the preset range may be set less than, equal to, or greater than 40 meters. In some embodiments, the preset range may be set less than, equal to, or greater than 30 meters. In some embodiments, the preset range may be set less than, equal to, or greater than 20 meters. In some embodiments, the preset range may be set less than, equal to, or greater than 10 meters. The detailed location may be displayed to the passenger as a list for the passenger to choose.

The detailed location generated by the positioning engine 110 is a more detailed description of the address location in the order that can be more easily understood and recognized by the driver. In some embodiments, the detailed location may be stored in the system. The system may store one or more detailed locations relating to a certain location. After determining an order of a passenger, the system may extract one or more detailed locations relating to the starting location of the order directly based on the relation between the one or more detailed locations and the starting location. The detailed locations may be stored in the database 130, the storage module 220, or other modules or units with a storing function of the on-demand service system 105. In some embodiments, after obtaining the order, the on-demand service system 105 may collect information within the preset range from the starting location of the order to obtain the detailed locations.

In step 1150, the positioning engine 110 may obtain a response to the detailed locations by the passenger. In some embodiments, the response to the detailed locations may include directly selecting one of the detailed locations and sending the selected location to the positioning engine 110. In some embodiments, the response to the detailed locations may include selecting multiple detailed locations and sending the selected locations to the positioning engine 110. In some embodiments, the response to the detailed locations may include removing one or more detailed locations provided by the positioning engine 110. It should be noted that the above description of the processing of the detailed locations sent by the positioning engine 110 is merely illustrative and not intended to limit the present disclosure. In some embodiments, other processing methods may also be included.

In step 1160, the positioning engine 110 may send a processed result of the detailed location generated by the passenger to the driver terminal device 140 via the driver interface 240. Based on the above result, the driver may determine the particular location of the passenger, or a location for getting on a car, e.g., a meetup location.

It should be noted that the above description of generating the optimized location information is merely illustrative, and not intended to limit the scope of the present disclosure. For persons having ordinary skills in the art, various variations and modifications of generating the optimized location information may be conducted under the teaching of the present disclosure. However, those variations and modifications may not depart the spirit and scope of this disclosure. In some embodiments, other steps may also be added. For example, after obtaining a processed result of the detailed location generated by a passenger, the positioning engine 110 may further process the result. In some embodiments, a processed result of a passenger obtained by the positioning engine 110 may include multiple detailed locations. The positioning engine 110 may rate the multiple detailed locations and select a result with the highest rating as a final result and sent the final result to a driver. The above processing may also include converting the format of the processing result. The converting methods may include text-to-voice, picture-to-voice, video-to-voice, voice-to-text, voice-to-text, voice-to-picture, or the like, or any combination thereof. In some embodiments, the response of a driver to an order may include directly obtaining the order without performing other steps. For example, step 1140, step 1150, and step 1160 may be omitted. These modifications and variations are still within the scope of the above description.

Figure 12:
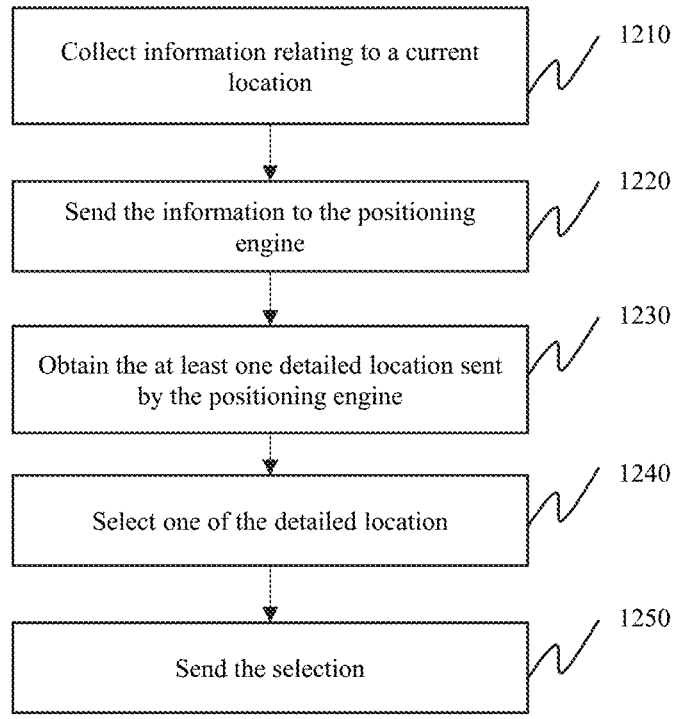
FIG. 12 is a flow chart of an exemplary process for precise positioning by a passenger terminal device according to some embodiments of the present disclosure.

FIG. 12 is a flow chart of an exemplary process for precise positioning by the passenger terminal device 120 according to some embodiments of the present disclosure. After a passenger sends a service order request, a driver may quickly obtain an approximate location of the passenger. But the location may not be precise enough. For example, the passenger may be in a large building with multiple exits or in an unfamiliar place, such that it may hard for the passenger to describe his/her precise location. In addition, a conventional positioning technology may normally have a certain deviation. Thus, it may be hard for the driver to find the passenger only based on a simple address obtained using the positioning technology. In some embodiments, a driver and a passenger cannot find each other even if they are very close. In step 1210, information relating to a current location may be collected by the passenger terminal device 120. The information relating to the current location may be geographic coordinate information, the descriptive name of a starting location, information in other forms such as image (still images or videos) information, other information relating to a precise location, or the like. The geographic coordinate information may be obtained by the positioning module 630 of the passenger terminal device 120, or generated by a map interface displayed by the content presentation module 610 operated by the passenger. The description name of the starting location may be inputted or selected by the passenger. The other forms of information may be collected or recorded by the passenger through the passenger terminal device 120. For example, the image information may be collected by the I/O module 620 of the passenger terminal device 120. In some embodiments, other information relating to a precise location may be in the form of a bar code or a quick response code. The bar code or the quick response code may be posted on a precise location and related to a precise geographic coordinate and/or the description name of a starting location.

In step 1220, after collecting the information relating to the current location, the passenger terminal device 120 may send the information to the positioning engine 110. The information relating to the current location may constitute the order information of a transportation service request. According to some embodiment of the present disclosure, the passenger terminal device 120 may access the network 150 via a network access device (e.g., cellular network base stations 150-1, 150-2 or wireless network access points) and send the collected information relating to the current location to the positioning engine 110.

In step 1230, the passenger terminal device 120 may obtain at least one detailed location sent by the positioning engine 110. The positioning engine 110 may respond to a response of the driver terminal device 140 with respect to a transportation service request order. The detailed location may be partially based on the information relating to the current location sent by the passenger terminal device 120. The detailed location may include a meetup location (e.g., the meetup location may be a location where the passenger gets on the car) that is recommended to the passenger by the positioning engine 110 or a meetup location that is provided to the passenger by the driver terminal device 140 through the positioning engine 110. The meetup location may be stored in the database 130 or provided by the information source 160. In some embodiments, the passenger terminal device 120 may obtain a detailed location in step 1230. The detailed location may be designated as the precise location of the passenger by the positioning engine 110. Alternatively, the passenger terminal device 120 may use the content presentation module 610 to display the obtained detailed location. The obtained detailed location may be displayed in the form of text, map, image, or the like.

In step 1240, after receiving the detailed locations sent by the positioning engine 110, the passenger may select one of the detailed location(s) by the passenger terminal device 120. The detailed locations sent by the positioning engine 110 may be displayed by the content presentation module 610 of the passenger terminal device 120. The passenger may select one detailed location of the displayed detailed locations by the I/O module 620. It can be understood that the passenger may select more detailed locations.

In step 1250, after obtaining a selection of the detailed locations of the passenger by the I/O module 620, the passenger terminal device 120 may send the selection to the positioning engine 110.

It should be noted that some steps in the flow chart may be omitted or skipped. For example, after obtaining the detailed locations sent by the positioning engine 110 in step 1230, the process may end. The passenger terminal device 120 may not need to wait for the selection or confirmation of the passenger.

Figure 13:
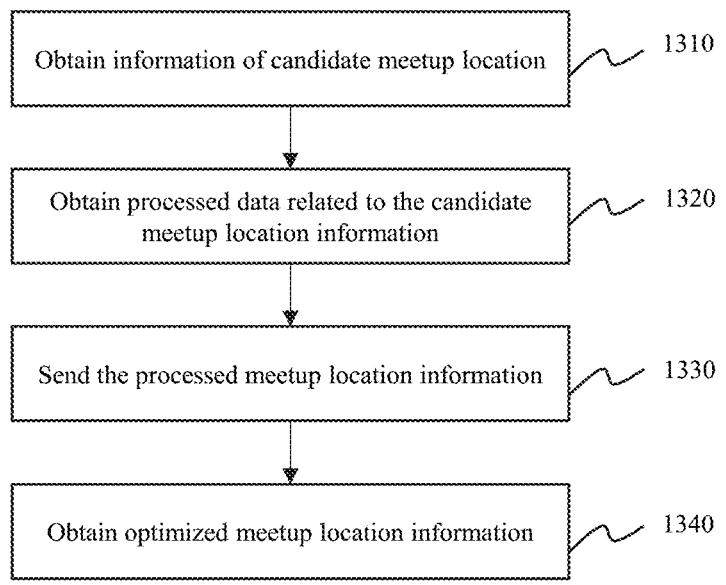
FIG. 13 is a flow chart of an exemplary process for processing meetup location by a driver terminal device according to some embodiments of the present disclosure.

FIG. 13 is a flow chart of an exemplary process for processing a meetup location by the driver terminal device 140 according to some embodiments of the present disclosure. In step 1310, the driver terminal device 140 may obtain information of candidate meetup location sent by the positioning engine 110. The driver terminal device 140 may obtain the information of candidate meetup location upon or after obtaining a transportation service request. The information of candidate meetup location may constitute a candidate meetup location set. Elements in the set may relate to a single meetup location, or multiple meetup locations, such as a list of meetup locations. The meetup location information may include geographic coordinate information, a description and/or name of the meetup location, or types of the meetup location. For example, the types of the meetup location may be "shop," "restaurant," "public facility," "residential area," or the like. After obtaining the candidate meetup location information, the driver device 140 may display the information using the content presentation module 610. The information may be displayed using one or more displaying methods, such as representing the geographic coordinate information of the meetup location information in the form of by displaying one or more icons or representing the description and/or name and/or type of the above meetup location information in the form of text (normal or multimedia).

In step 1320, the driver device 140 may obtain processed data related to the displayed candidate meetup location information (e.g., a processed candidate meetup location) by the driver via the I/O module 620. The processed data related to the candidate meetup location set may be generated by processing the candidate meetup location set by the service requester. The processing may include selecting, removing, and evaluating one or more candidate meetup locations. The above evaluation may be performed in the form of rating in text or scoring. The above evaluation may represent preference of a driver for one or more candidate meetup locations. The processing of the displayed candidate meetup location may also include updating the candidate meetup location information. According to some embodiments, the above updating may be adding one or more candidate meetup locations by the driver terminal device 140, modifying one or more candidate meetup locations by the driver terminal device 140, or the like. The above method of the processing of the displayed candidate meetup location may be a method that the driver deletes, adds, or moves the candidate meetup location icons on the map interface by the I/O module 620. Also, the above method of the processing of the displayed candidate meetup location may be a method that the driver deletes, adds, or modifies the description and type of the candidate meetup location.

In step 1330, the driver terminal device 140 may send the processed meetup location information to the positioning engine 110 via the communication module 640 for calculating and processing.

In step 1340, the driver terminal device 140 may obtain optimized meetup location information from the positioning engine 110. The optimized meetup location information may be partially/completely based on the processing of the candidate meetup location information of the driver, the processing of the candidate meetup location information of the passenger, or information from the information source 160, or any combination of multiple methods of processing and/or information.

Preferably, the content presentation module 610 of the driver terminal device 140 may display the obtained optimized meetup location information. In some embodiments, the content presentation module 610 may display the optimized meetup location information in the form of by displaying one or more icons on a map interface. In some embodiments, the content presentation module 610 may display the description of the meetup location near the icon representing the optimized meetup location information. In some embodiments, the content presentation module 610 may display the current location information of the driver on a map interface at the same time.

It should be noted that one or more steps of the flow chart described above may be omitted. According to some embodiments, steps 1320, 1330, and 1340 may be skipped. For example, the driver terminal device 140 may obtain candidate meetup location information from the positioning engine 110 without performing a process on the candidate meetup location and subsequent processes.

Figure 14:
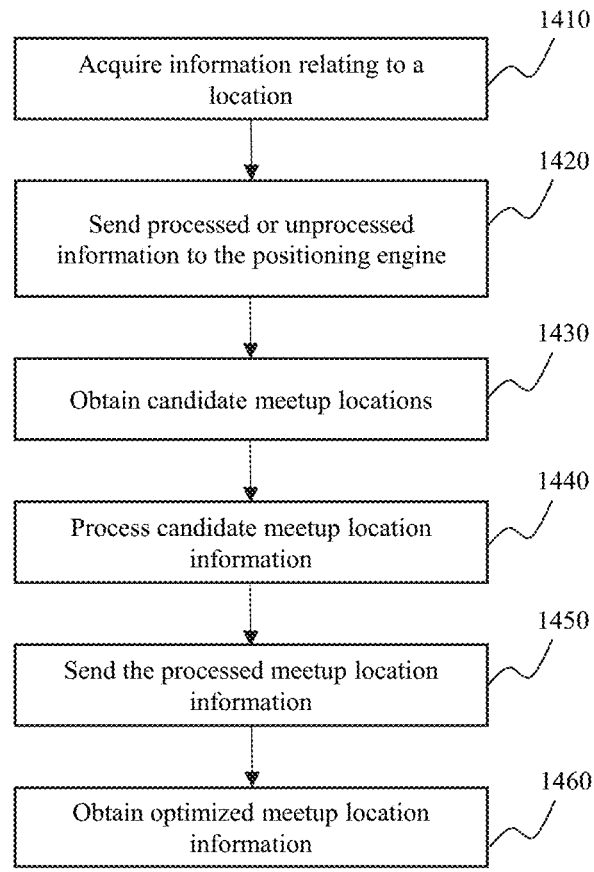
FIG. 14 is a flow chart of an exemplary process for determining a meetup location according to some embodiments of the present disclosure.

FIG. 14 is a flow chart of an exemplary process for determining a meetup location by a passenger according to some embodiments of the present disclosure. In some embodiments, the current location of a passenger is the meetup location (e.g., the meetup location may be the location where the passenger gets on the car) of the passenger. In some embodiments, the current location of a passenger is not the meetup location of the passenger. In some other embodiments, the meetup location may be referred to as a pickup point, a starting location of an order, a departure location, or the like.

In step 1410, information relating to a location may be acquired by the passenger terminal device 120. The information relating to the location may include the current location of the passenger, the starting location of an order, the ending location of an order, or the like, or any combination thereof. In some embodiments, the process of acquiring the information relating to the location may be implemented by the positioning module 630 of the passenger terminal device 120. The positioning module 630 may determine the location of the passenger using one or more positioning technologies. The positioning technologies may include a Global Positioning System (GPS) technology, a Global Navigation Satellite System (GLONASS) technology, a Beidou navigation system technology, a Galileo positioning system (Galileo) technology, a Quasi-Zenith Satellite System (QAZZ) technology, a base station positioning technology, a Wi-Fi positioning technology, or the like, or any combination thereof. In some embodiments, the process of acquiring the information relating to the location may be implemented by the I/O module 620 of the passenger terminal device 120. The names of the current location, the starting location, and the ending location of an order may be inputted by a passenger. The method of performing of the information relating to the location may include but is not limited to in a text format, an image format, a video format, an audio format, or the like, or performing the information relating to the location in any combination thereof. It should be noted that the passenger terminal device 120 may obtain other information. The other information may include but is not limited to a passenger's name, contact information, planned pickup time, or the like, or any combination thereof. The process of acquiring the other information may be implemented by the I/O module 620. After obtaining the information relating to the location, the processing module 650 of the passenger terminal device 120 may process the obtained information relating to the location. The processing of the obtained information relating to the location may include but is not limited to format converting, or the like. The passenger terminal device 120 may store the obtained information relating to the location and other information in the storage module 660, the server 130, or other modules and units of the system that can store data.

Next, in step 1420, the passenger may send the processed or unprocessed information relating to the location and/or the other information to the on-demand service system 105 or the positioning engine 110. The process of sending the information relating to the location and/or the other information may be conducted simultaneously or in a particular sequence. In some embodiments, information relating to the location obtained from the passenger terminal device 120 may include the current location and the destination of a passenger. The passenger may designate the current location as a meetup location. In some embodiments, the passenger may simultaneously send the current location, the meetup location, and the destination. In some embodiments, the on-demand service system 105 or the positioning engine 110 may generate one or more candidate meetup locations for a passenger to choose from based on the information relating to the location sent by the passenger terminal device 120. The number of the candidate meetup locations may be arbitrary, for example, one, two, three, four, five, six, or any other number.

In step 1430, the passenger terminal device 120 may obtain the candidate meetup location sent by the on-demand service system 105 or the positioning engine 110. Step 1430 may be performed by the communication module 640 of the passenger terminal device 120. The candidate meetup location may be displayed to the passenger in the form of a list. In some embodiments, the priority of each candidate location may be different, e.g., each candidate location having its corresponding priority. The candidate location with the highest priority may be regarded as the optimized meetup location by the on-demand service system 105 or the positioning engine 110. The candidate meetup locations obtained by the passenger may be ranked from high to low or from low to high based on the priority of the locations. In some embodiments, the priority of the candidate meetup locations may be the same. And the displayed candidate meetup location is not ranked based on the priority.

After the passenger terminal device 120 obtains the candidate meetup location sent by the on-demand service system 105 or the positioning engine 110, the candidate meetup location information may be processed in step 1440. And the processed candidate meetup location information may be sent to the on-demand service system 105 or the positioning engine 110 in step 1450. The processing of the candidate meetup location information may be implemented by the processing module 650 of the passenger terminal device 120. The process of sending the processed candidate meetup location information to the on-demand service system 105 or the positioning engine 110 may be implemented by the communication module 640. The processing of the candidate meetup location information may include but is not limited to directly selecting one of the candidate meetup locations as the final meetup location by the passenger, selecting or removing one or more of the candidate meetup locations. In some embodiments, a passenger may think that some of the candidate meetup locations sent by the on-demand service system 105 or the positioning engine 110 may be relatively inconvenient based on the current location of the passenger. Thus, the passenger may directly delete those inconvenient candidate meetup locations using the passenger terminal device 120. In some embodiments, a passenger may think that one or more of the candidate meetup locations sent by the on-demand service system 105 or the positioning engine 110 are acceptable. Thus, the passenger may choose those candidate meetup locations using the passenger terminal device 120.

After the passenger terminal device 120 sends the processed candidate meetup location information to the on-demand service system 105 or the positioning engine 110, the on-demand service system 105 or the positioning engine 110 may further process the processed candidate meetup location information. Optimized meetup location information may be generated and sent to the passenger terminal device 120. In step 1460, the passenger terminal device 120 may obtain the optimized meetup location information. Step 1460 may be performed by the communication module 640 of the passenger terminal device 120. It should be noted that the "optimized meetup location" herein may be described as an optimal meetup location, a final meetup location, a starting location of an order, or the like. All those descriptions represent a place where the driver and the passenger may finally meet.

It should be noted that the above description of the process of generating meetup locations is merely illustrative, and not intended to limit the scope of the present disclosure. For persons having ordinary skills in the art, various variations and modifications of generating meetup locations may be conducted under the teaching of the present disclosure. However, those variations and modifications may not depart the spirit and scope of this disclosure. In some embodiments, some steps of the process of generating the meetup locations may be omitted. For example, information relating to a location sent to the on-demand service system 105 or the positioning engine 110 by the passenger terminal device 120 may be accepted by the on-demand service system 105 or the positioning engine 110. The meetup location or the current location of a passenger obtained by the passenger terminal device 120 may be designated as the final meetup location. The final meetup location may be a location where the driver and the passenger want to meet. Thus, step 1430 to step 1460 may be omitted. As another example, the on-demand service system 105 or the positioning engine 110 may generate one candidate meetup location, and the candidate meetup location may be sent to the driver and the passenger as the final meetup location. In this case, the driver and the passenger may not need to perform any further operation. For the passenger terminal device 120, step 1440, step 1450 and step 1460 may not need to be performed after performing step 1430. Those modifications and variations are still within the scope of the above description. In addition, the above description of the process of determining meetup locations by the passenger terminal device 120 is merely illustrative. Some steps (such as storing) are not shown in the flow chart. However, it does not indicate that the intermediate results and the final results of the flow chart described above are not stored. In some embodiments, some or all of the intermediate results and the final results of the flow chart described above may be stored. The storing location may include but not limited to the storage module 660 of the passenger terminal device 120, the database 130, the storage module 220 of the positioning engine 110, or other units and modules of the on-demand service system 105 that can store data.

Figure 15:
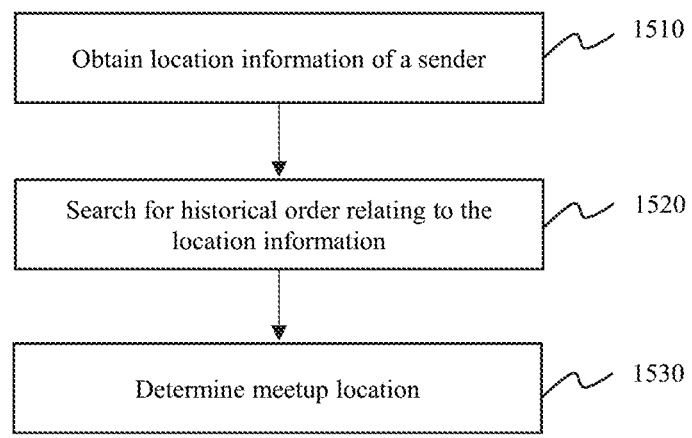
FIG. 15 is another flow chart of an exemplary process for determining a meetup location according to some embodiments of the present disclosure.

FIG. 15 is a flow chart of an exemplary process for determining a meetup location according to some embodiments of the present disclosure. In step 1510, the positioning engine 110 may obtain location information sent by an order sender (e.g., the passenger). Step 1510 may be performed by the passenger interface 230. The location information may include but is not limited to a current location of the passenger, a starting location of the order, an ending location of the order, or the like, or any combination thereof. The positioning engine 110 may also obtain other information via the passenger interface 230. The description about the other information is similar to the descriptions elsewhere in the present disclosure.

After the positioning engine 110 obtains the location information of the passenger, the positioning engine 110 may search for historical orders in step 1520. The historical orders may be stored in the database 130, the storage module 220 of the positioning engine 110, or other modules or units of the on-demand service system 105 that can store data. In some embodiments, the historical orders may include one or more orders within a given time period. In some embodiments, the historical orders may include one or more orders within a preset threshold. The preset threshold may be a distance between a starting location of the historical order and the current location of the passenger. In some embodiments, the historical order may include one or more orders within a preset threshold in a given time period. The given time period may include one day or multiple days, one week or multiple weeks, one month or multiple months, or the like. In some embodiments, the given time period may be two months. In some embodiments, the given time period may be a random value or a fixed value. In some embodiments, the given time period may be determined based on experience or experimental data. In some embodiments, the given time period may be related to a passenger account that sends an order. In some embodiments, the given time period may be related to a driver account that obtains the order. In some embodiments, the given time period may be related to particular location information, for example, the given time period may be different according to different locations. The above preset threshold may be determined based on experience or experimental data. The preset threshold may be greater than, equal to, or less than 500 meters. In some embodiments, the preset threshold may be 1 meter to 200 meters, 200 meters to 300 meters, 300 meters to 400 meters, or 400 meters to 500 meters. In some embodiments, the preset threshold may be 1 meter to 50 meters, 50 meters to 100 meters, 100 meters to 150 meters, or 150 meters to 200 meters. In some embodiments, the preset threshold may be 10 meters, 20 meters, 30 meters, 40 meters, 50 meters, 60 meters, 70 meters, 80 meters, 90 meters, 100 meters, or the like. For example, when the preset threshold is 100 meters, e.g., when the distance between a starting position of a historical order and a current location of a passenger is less than 100 meters, it shows that the starting location of the historical order is located in proximity to the passenger.

After obtaining the historical order, the positioning engine 110 may determine the meetup location in step 1530 based on the historical order described above. In some embodiments, the meetup location may be determined by determining an average or clustered value of a starting location of the historical order as a final meetup location. In some embodiments, the historical order may not be obtained. If the location information acquired in step 1510 include information relating to the meetup location, then the meetup location may be directly designated as the final meetup location. If the location information acquired in step 1510 does not include the meetup location but includes the current location of the passenger, then the current location of the passenger may be designated as the final meetup location. In some embodiments, the positioning engine 110 may rank the searched historical orders from the smallest to the largest based on the distance between the starting location and the current location of the passenger, and designate the starting location of a historical order with the smallest distance as a final meetup location. The positioning engine 110 may then send the final meetup location to the passenger and a driver. In some embodiments, after obtaining an order sent by a passenger, the positioning engine 110 may further filter the historical orders obtained in step 1520 based on other information such as current traffic conditions, time, weather, or the like, and determine a final meetup location based on the filtered result.

In addition, in some embodiments, the location information obtained by the positioning engine 110 in step 1510 may include information about the meetup location. If both the positioning engine 110 and a driver accept the location, the positioning engine 110 may not have to perform step 1520. The location described above may be directly designated as the final meetup location.

The route processing unit 340 of the positioning engine 110 may generate one or more routes from the current position of the driver to the meetup location and one or more routes from the meetup location to the ending location of the order based on the meetup location, the current location of the driver, and the ending location of the order. The route planning methods and designing factors thereof may be found elsewhere in the present disclosure, and will not be further described here. The positioning engine 110 may send the one or more routes described above to the passenger terminal device 120 and/or the driver terminal device 140 via the passenger interface 230 and/or the driver interface 240.

It should be noted that the above description of the process of generating meetup locations is merely illustrative, and not intended to limit the scope of the present disclosure. For persons having ordinary skills in the art, various variations and modifications of generating meetup locations may be conducted under the teaching of the present disclosure. However, those variations and modifications may not depart the spirit and scope of this disclosure. All such modifications and variations are within the protection scope of the present disclosure.

Figure 16:
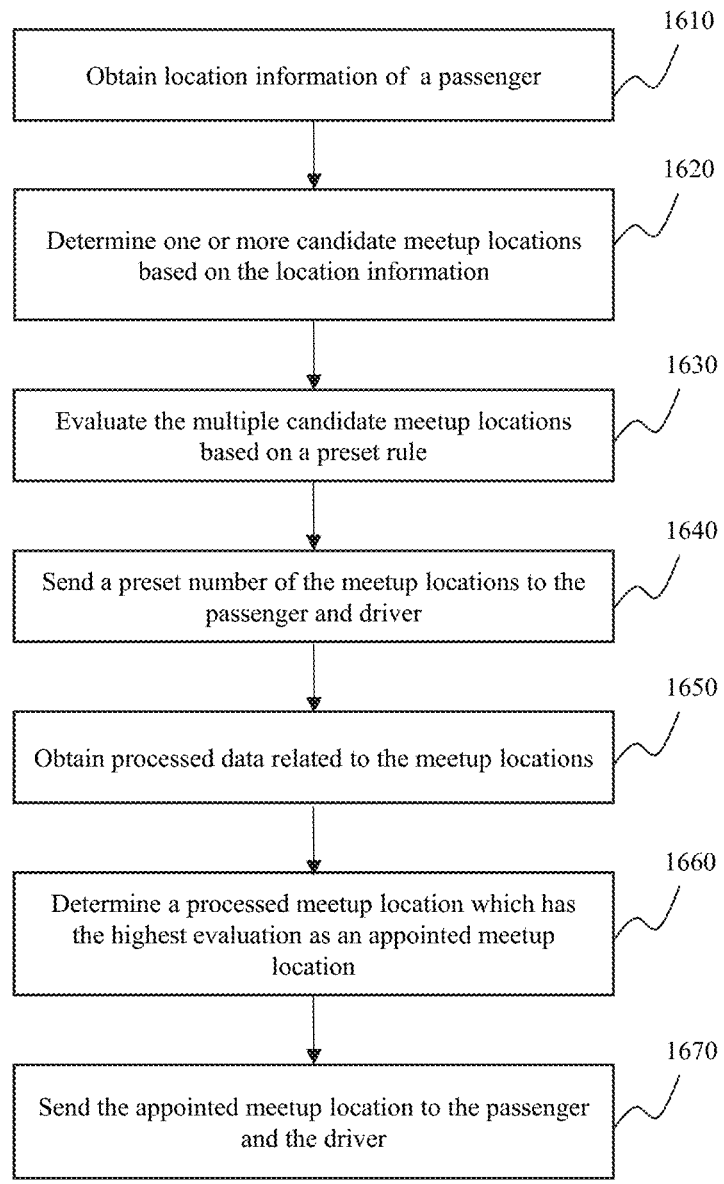
FIG. 16 is a flow chart of an exemplary process for determining a meetup location by a positioning engine according to some embodiments of the present disclosure.

FIG. 16 is a flow chart of an exemplary process for determining a meetup location by the positioning engine 110 according to some embodiments of the present disclosure. In step 1610, location information of a passenger may be obtained by the passenger interface 230 of the positioning engine 110 via the network 150. The location information may include an approximate positioning location or a precise positioning location. The location information of the passenger may be included in a service request. The service request may include other information such as indications or preferences of the passenger for a final meetup location.

In step 1620, the positioning engine 110 may determine one or more candidate meetup locations based on the location information. According to some embodiments of the present disclosure, when the positioning engine 110 obtains the service request of the passenger and the location information, the location analyzing unit 310 may identify where the passenger is located according to the location information of the passenger. The positioning engine 110 may calculate multiple popular meetup locations in the area and then designate the multiple popular meetup locations as candidate meetup locations by accessing the meetup locations of historical order records in the area stored in the database 130.

According to some embodiments of the present disclosure, the positioning engine 110 may determine a candidate meetup location based on a certain threshold distance. Based on the passenger location, the positioning engine 110 may search a meetup location within a certain threshold range from the passenger location. The meetup location may then be designated as the candidate meetup location.

According to some embodiments of the present disclosure, based on preferences or indications of the passenger for the meetup location of service request of the passenger, the meetup location that the passenger may prefer to choose or indicate may be designated as a candidate meetup location.

Next, in step 1630, based on a preset rule, the meetup location processing unit 330 of the positioning engine 110 may evaluate multiple candidate meetup locations. Based on different evaluation criteria and evaluation methods, the preset rules of evaluation may be different. According to some embodiments of the present disclosure, the evaluation criteria may be distances between the location of the passenger and each of multiple candidate meetup locations (the distance may be straight-line distance or road distance), time spent from the location of the passenger to each of multiple candidate meetup locations, traffic and road conditions from the location of the passenger to each of multiple candidate meetup locations, route safety situations from the location of the passenger to each multiple candidate meetup locations, or the like, or any combination thereof. According to some embodiments of the present disclosure, the method of evaluation may include scoring and/or ranking.

The following examples are intended to simply describe the evaluation methods and criteria. For example, a shorter distance between the location of the passenger and one of the multiple candidate meetup locations may generate a higher score/rank. According to some embodiments of the present disclosure, a shorter time spent from the location of the passenger to one of the multiple candidate meetup locations may generate a higher score/rank. According to other embodiments of the present disclosure, a smaller traffic congestion level of the route from the location of the passenger to one of the multiple candidate meetup locations may generate a higher score/rank. According to other embodiments of the present disclosure, a higher security index of the route from the location of the passenger to one of the multiple candidate meetup locations may generate a higher score/rank.

In step 1640, the positioning engine 110 may select a preset number of meetup locations based on the evaluation of each candidate meetup location in step 1630. Then, the meetup locations may be sent to the passenger terminal device 120 and the driver terminal device 140 via the passenger interface 230 and the driver interface 240, respectively. According to some embodiments, the preset number may be optional. For example, the preset number may be 1 to 5, or other numerals. The method of selecting may include selecting a meetup location with a higher score or rank based on the score or rank, removing a candidate meetup location based on some thresholds or scopes of the score or rank, or the like.

In some embodiments, the positioning engine 110 may send the preset number of meetup locations to the passenger terminal device 120 via the passenger interface 230, but not send the same information to the driver terminal device 140. Similarly, the positioning engine 110 may send the preset number of meetup locations to the driver terminal device 140 via the driver interface 240, but not send the same information to the passenger terminal device 120.

In step 1650, the positioning engine 110 may obtain processed data related to the meetup location by the passenger terminal device 120 and the driver terminal device 140 via the passenger interface 230 and the driver interface 240, respectively. The processing of the meetup location by the passenger and the driver may include selecting, eliminating, evaluating or updating one or more candidate meetup locations. The evaluation may be performed in the form of rating in text or scoring. The evaluation may represent the preference of the passenger or the driver for one or more candidate meetup locations.

In some embodiments, the passenger terminal device 120 and the driver terminal device 140 may receive five candidate meetup locations (a, b, c, d, e) from the positioning engine 110. The passenger may eliminate locations b, c, and d using the passenger terminal device 120. The driver may eliminate locations c and d using the driver terminal device 140. A result of the locations b, c, and d that are marked as "elimination" may be returned. In some embodiments, the positioning engine 110 may obtain a preset number of selected meetup locations from the passenger terminal device 120 and the driver terminal device 140, respectively. For example, if the passenger terminal device 120 and the driver terminal device 140 both obtain five candidate meetup locations (a, b, c, d, e), the passenger may select locations b, c, and d by the passenger terminal device 120 and the driver may select locations c and d by the driver terminal device 140. Finally, the positioning engine 110 may obtain candidate meetup location (b, c, d) returned by the passenger terminal device 120 and candidate meetup location (c, d) returned by the driver terminal device 140.

In some embodiments, the positioning engine 110 may obtain the processing of the meetup locations by the passenger terminal device 120 via the passenger interface 230, but not obtain similar information from the driver terminal device 140. Similarly, the positioning engine 110 may obtain the processing of the meetup locations by the driver terminal device 140 via the driver interface 240, but not obtain similar information from the passenger terminal device 120.

In step 1660, a processed meetup location which has the highest evaluation may be determined as an appointed meetup location by the processing module 210 of the positioning engine 110. Herein, the processing module 210 may firstly preprocess the processing of the meetup locations by the passenger terminal device 120 and the driver terminal device 140 to obtain a set that includes at least one meetup location. The preprocessing of the meetup locations may include performing a set operation on the meetup locations received from the passenger terminal device 120 and the driver terminal device 140. For example, the set operation may include an intersection operation, a union operation, a complementary set operation, or the like. The processing module 210 may obtain a set including at least one meetup location by preprocessing.

After obtaining the set, the processing module 210 may evaluate the meetup location of the set based on the preset rule in step 1630. The evaluation criteria and methods may be found in above description and will not be further described here. According to the score of scoring or the rank of ranking, a meetup location with the highest evaluation (the highest score or top rank) may be determined as an appointed meetup location for the passenger and the driver.

In step 1670, the positioning engine 110 may send the appointed meetup location to the passenger terminal device 120 and the driver terminal device 140, and thus inform both service sides of the meetup location.

Base on the meetup location, the current location of the driver and the ending location of the order described above, the route processing unit 340 of the positioning engine 110 may generate one or more routes from the current location of the driver to the meetup location, and one or more routes from the meetup location to the ending location of the order. The routes planning methods and designing factors thereof may be found elsewhere in the present disclosure, and will not be further described here. The positioning engine 110 may send the routes to the passenger terminal device 120 and/or the driver terminal device 140 via the passenger interface 230 and/or the driver interface 240.

In some embodiments, the positioning engine 110 may send the meetup locations and the routes in different forms. The different forms may include but is not limited to voice, text, image, or the like. For example, the positioning engine 110 may send the meetup location and the routes to the passenger terminal device 120 and/or the driver terminal device 140 via the passenger interface 230 and/or the driver interface 240 using a voice broadcasting method.

Figure 17:
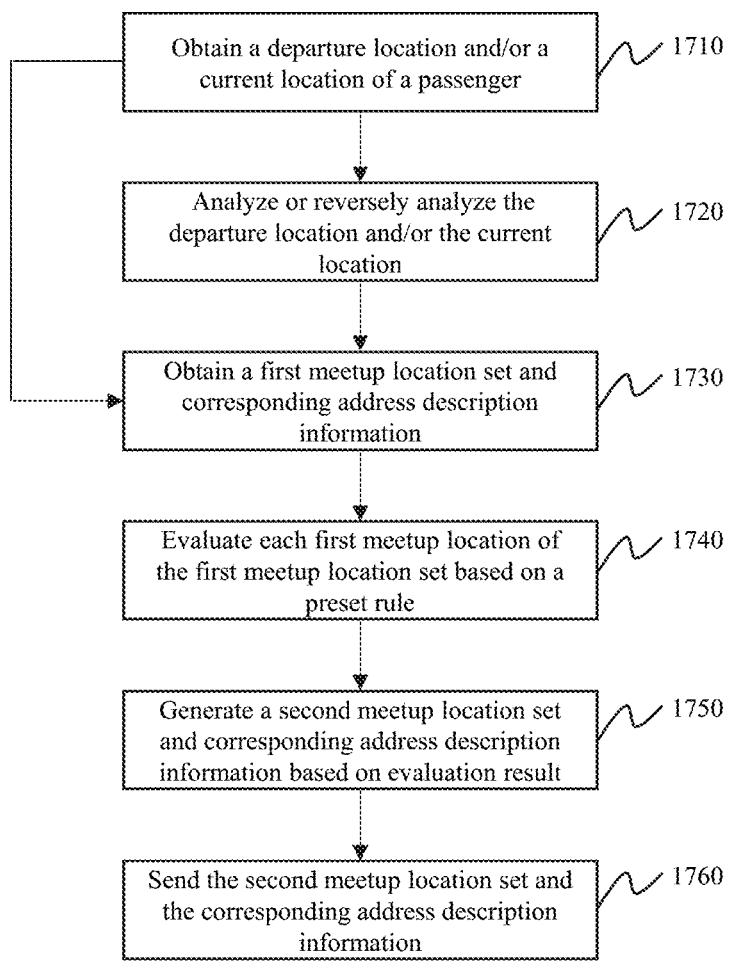
FIG. 17 is a flow chart of an exemplary process for determining a meetup location by a positioning engine according to some embodiments of the present disclosure.

FIG. 17 is a flow chart of an exemplary process for determining a meetup location by the positioning engine 110 according to some embodiments of the present disclosure. In step 1710, the positioning engine 110 may obtain a departure location and/or a current location of a passenger. The departure location and/or the current location of the passenger may be location information in a text format inputted by the passenger, geographic coordinate information selected by the passenger (e.g., sliding map interface, selecting pull-down menu, etc.), information of voice inputted by the passenger including the departure location and/or the current location, or multimedia information such as an image taken by the passenger using the passenger terminal device 120. In some embodiments, the departure location of the passenger may not be the same as the current location of the passenger. For example, a passenger may reserve a transportation service, and the location of the transportation service is not the final departure location.

After obtaining the departure location and/or the current location, the positioning engine 110 may analyze or reversely analyze the information in step 1720. If the form of storing map data does not match the form of the obtained departure location and/or the current location, the positioning engine 110 may analyze or reversely analyze the obtained location. For example, the positioning engine 110 may store map data in the form of geographic coordinates. When the location information obtained by the positioning engine 110 is address description information, such as the name or the street number of a store, the positioning engine 110 may search the description of the store to find the corresponding geographic coordinate such as longitude and latitude information by the address analyzing unit 310 of the processing module 210. As another example, the positioning engine 110 may store map data in the form of street numbers. When the positioning engine 110 obtains the geographic coordinate information of a certain place, the address analyzing unit 310 of the processing module 210 may reversely analyze the geographic coordinate information to find the corresponding address description information such as the street number. The address description information described above may be map data in the database 130.

After analyzing or reversely analyzing the address, the positioning engine 110 may obtain a first meetup location set and the corresponding address description information based on the departure location and/or the current location of the passenger in step 1730. The first meetup location set may be obtained based on different criteria. For example, the criterion may be a distance from the location of a driver to the departure location or the current location of the passenger. The distance may be a road distance or a straight-line distance. As another example, the criterion may be an average time of arrival from the location of the driver to the departure location of the passenger. The average time may be obtained based on speeds. After obtaining the first meetup location set, the address analyzing unit 310 of the processing module 210 may reversely analyze the address of the first meetup location set to find the corresponding address description information.

In step 1740, the meetup location processing unit 330 of the positioning engine 110 may evaluate each first meetup location of the first meetup location set based on a preset rule. There may be various preset rules of evaluation based on different evaluation criteria and evaluation methods. The details of the evaluation criteria and the evaluation methods may be found in step 1630 in FIG. 16, and will not be further described here.

After obtaining the evaluation of the first meetup location set, the positioning engine 110 may generate a second meetup location set and the corresponding address description information in step 1750.

The process of generating the second meetup location set may be selecting some meetup locations from the first meetup location set to obtain a second meetup locations set that includes at least one second meetup location based on the evaluation results. In some embodiments, based on a preset number N, the positioning engine 110 may select N first meetup locations with the highest score or ranking top N first meetup locations. In some embodiments, the positioning engine 110 may mark the first meetup locations which may exceed the preset threshold evaluation (e.g., the preset threshold evaluation may be a certain percentage) as the second meetup locations. In some embodiments, the preset number N may be adjusted as needed. Some or all of the first meetup location set may be selected as the second meetup location set. When selecting some of the first meetup locations, the first N meetup locations may be selected based on a certain ranking order of the evaluation results. Similarly, the percentages may be adjusted as needed.

The process described above may also be a duplicate removal process of the first meetup location set. According to some embodiments, the positioning engine 110 may determine whether the distance between any two first meetup locations is less than a preset distance. The positioning engine 110 may perform the duplicate removal process and remove a part of the first meetup locations to obtain one or more second meetup locations in response to determining that the distance between any two first meetup locations is less than a preset distance. The distance between the two first meetup locations may be a straight-line distance, a road distance, or a travel distance.

After obtaining the second meetup location set, the positioning engine 110 may obtain the corresponding address description information of the second meetup location set by analyzing addresses and/or reversely analyzing addresses. The description of the process may be found in step 1720, and will not be further described here.

In step 1760, the positioning engine 110 may send the generated second meetup location set and the corresponding address description information to the passenger terminal device 120 and/or the driver terminal device 140 via the passenger interface 230 and/or the driver interface 240, respectively. In some embodiments, the generated second meetup location set and the corresponding address description information may be sent to the passenger terminal device 120 and the driver device 140 in different forms. According to some embodiments of the present disclosure, the meetup locations may be sent to the passenger terminal device 120 and/or the driver device 140 in the form of text. The address description information may be sent to the passenger terminal device 120 and/or the driver device 140 in the form of text or voice.

The route processing unit 340 of the positioning engine 110 may generate one or more routes from the current location of the driver to the meetup location and one or more routes from the meetup location to the ending location of the order based on the meetup location, the current location of the driver, and the ending location of the order described above. The route planning methods and design elements may be found elsewhere in the present disclosure, and will not be further described here. The positioning engine 110 may send the routes to the passenger terminal device 120 and/or the driver terminal device 140 via the passenger interface 230 and/or the driver interface 240.

It should be noted that the above description of generating the meetup locations is merely illustrative, and not intended to limit the scope of present disclosure. For persons having ordinary skills in the art, various variations and modifications of generating the meetup locations may be conducted under the teaching of the present disclosure. However, those variations and modifications may not depart the spirit and scope of this disclosure. For example, after obtaining the departure location and/or the current location of the passenger, the positioning engine 110 may skip step 1720 and directly perform step 1730.

Figure 18:
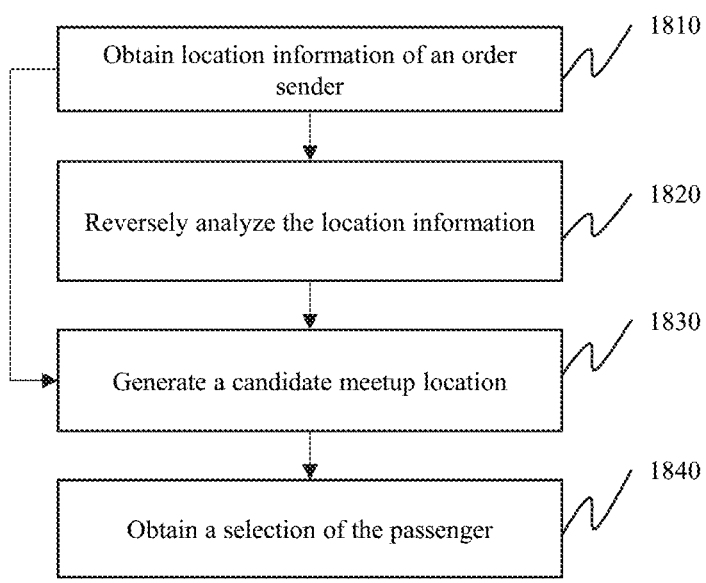
FIG. 18 is a flow chart of an exemplary process for generating a meetup location by a positioning engine according to some embodiments of the present disclosure.

FIG. 18 is a flow chart of an exemplary process for generating a meetup location by the positioning engine 110 according to some embodiments of the present disclosure. In step 1810, the positioning engine 110 may obtain location information of an order sender (e.g., the passenger). In other parts of the present disclosure, "location information" may be represented by "address information" or "address location information". Step 1810 may be performed by the passenger interface 230. The location information may include but is not limited to the current location of the passenger, the starting location of the order, the ending location of the order, or the like, or any combination thereof. The positioning engine 110 may obtain other information via the passenger interface 230. The description of the other information is similar to the descriptions in other parts of the present disclosure.

In some embodiments, the location information may be represented by coordinate of the location. The coordinate of the location may be longitude and latitude coordinate. In some embodiments, the location information may be represented by the name of the location. When the location information is represented by coordinate of the location, in step 1820, the positioning engine 1820 may reversely analyze the location information to generate location information that is represented by the name of the location. The analyzing for the location information may be implemented by the address analyzing unit 310. Next, in step 1830, the positioning engine 110 may generate a candidate meetup location according to the location information that is represented by the name of the location. If the location information obtained by the positioning engine 110 in step 1810 is represented by the name of the location, step 1820 may then be skipped and step 1830 may be directly performed to generate candidate meetup locations.

In step 1830, the number of the candidate meetup locations generated by the positioning engine 110 may be one, two, three, four, five, six, or any other number. Rules of generating the candidate meetup location may be based on historical orders or preset meetup locations that already stored in the positioning engine 110. The preset meetup locations may refer to some address locations stored in the positioning engine 110 or the database 130, for example, the address location may be a place of getting on or off a car or a place of temporary stop. Those address locations may be candidate meetup locations. The method of generating a candidate meetup location based on historical orders may be found in descriptions in other parts of the present disclosure.

In some embodiments, the positioning engine 110 may designate some address locations as meetup locations. The address locations that are designated as the meetup locations may be fixed within a certain time, or constantly updated. The updated period may include but is not limited to a week, a month, a quarter, half a year, a year, or the like. The methods of updating may include adding a new location as a meetup location and removing some existing meetup locations.

In some embodiments, the positioning engine 110 may store information of a meetup location. The meetup locations may effectively reduce the complexity of communication between the driver and the passenger about the departure location. Thus, the efficiency of pickup may be improved. The meetup locations may be stored in the database 130, the storage module 220 and other units and modules of the system that can store data. When obtaining the current location of a passenger and/or the starting location of an order sent by the passenger, the positioning engine 110 may search for a meetup location based on a certain rule and designate the obtained meetup location as a candidate meetup location. The rule may be searching pickup points within a certain distance range from the current location of the passenger or the starting location of the order. The distance range may be 1 to 200 meters, 200 to 300 meters, 300 to 400 meters or 400 to 500 meters. In some embodiments, the distance range may be 1 to 50 meters, 50 to 100 meters, 100 to 150 meters, or 150 to 200 meters. In some embodiments, the distance range may be 10 meters, 20 meters, 30 meters, 40 meters, 50 meters, 60 meters, 70 meters, 80 meters, 90 meters, 100 meters, or the like.

After generating candidate meetup locations, the positioning engine 110 may send the candidate meetup locations to the passenger terminal device 120. In addition, the positioning engine 110 may send other information to the passenger terminal device 120. The other information may include but is not limited to the distance between the candidate meetup location and the current location of the passenger, the time spent by the passenger from his/her current location to the candidate meetup location, the road condition of the candidate meetup location, or the like, or any combination thereof. The candidate meetup locations and other information may be displayed by the passenger terminal device 120 for the passenger's reference.

In some embodiments, after obtaining candidate meetup locations sent by the positioning engine 110, the passenger may directly select one of the candidate meetup locations as a final meetup location. The positioning engine 110 may send the final meetup location to the driver terminal device 140 and/or the passenger terminal device 120. In some embodiments, after a passenger obtains candidate meetup locations sent by the positioning engine 110, the passenger may select or delete one or more options and send the remaining options back to the positioning engine 110. Next, the positioning engine 110 may obtain a processing result of the candidate meetup location from the passenger terminal device 120. The positioning engine 110 may further process the processing result, and then generate a final meetup location. The method of further process the processing result by the positioning engine 110 may include scoring each remaining meetup location and designate the meetup location with the highest score as the final meetup location. The rules of scoring may be based on the level of traffic congestion of the road where the meetup location is located, the distance between the meetup location and the current location of the passenger, the time spent by the passenger from his/her current location to the meetup location, or the like, or any combination.

Based on the meetup location, the current location of the driver and the ending location of the order, the route processing unit 340 of the positioning engine 110 may generate one or more routes from the current location of the driver to the meetup location, and one or more routes from the meetup location to the ending location of the order. The route planning methods and designing factors thereof may be found elsewhere in the present disclosure, and will not be further described here. The positioning engine 110 may send the route to the passenger terminal device 120 and/or the driver terminal device 140 by the passenger interface 230 and/or the driver interface 240.

It should be noted that the above description of generating the meetup locations is merely illustrative, and not intended to limit the scope of present disclosure. For persons having ordinary skills in the art, various variations and modifications of generating the meetup locations may be conducted under the teaching of the present disclosure. However, those variations and modifications may not depart the spirit and scope of this disclosure.

FIG. 19-A is a flow chart of an exemplary process for coordinating distance measurement for multiple parties (e.g., the passenger terminal device 120 and the driver terminal device 140) by the positioning engine 110, when the passenger terminal device 120 is in proximity to the driver terminal device 140, according to some embodiments of the present disclosure. When a transportation service request of a passenger is accepted by a driver, the driver may go to a meetup location to pick up the passenger.

In step 1910, the positioning engine 110 may obtain preliminary positioning information from the passenger terminal device 120 and the driver terminal device 140 via the passenger interface 230 and the driver interface 240, respectively. The preliminary positioning information may or may not be obtained in real-time. The preliminary positioning information may be determined using one or more positioning technologies in general. The details of the positioning technologies may be found in the above descriptions, and will not be further described here. The preliminary positioning information of the passenger terminal device 120 and the driver terminal device 140 may be generated using a same positioning technology, or different positioning technologies. The positioning engine 110 may calculate a distance between two parties by the processing module 210 based on the preliminary positioning information of the parties. The distance may be a straight-line distance or a shortest road distance. In some embodiments, the road distance may be the shortest travel distance of a vehicle.

In step 1920, the positioning engine 110 may compare the calculated distance between the passenger terminal device 120 and the driver device 140 with a preset threshold value. In some embodiments, the preset threshold may be determined based on a signal coverage range and/or a measuring range of a measuring device. In some embodiments, the preset threshold may be determined individually based on historical orders of one of the parties. The preset threshold may also be determined collectively based on historical orders of the parties. The historical order information described above may be obtained by retrieving or querying the historical order database 710 of the database 130. In some embodiments, the preset threshold may be determined based on the geographic area and/or the particular location where the passenger terminal device 120 and the driver terminal device 140 are located. The particular geographic area and/or particular location information may be obtained by retrieving or querying the map database 720 of the database 130. In some embodiments, the preset threshold may be determined based on personal preferences of a passenger and a driver. The personal preferences may be obtained by retrieving or querying the user information stored in the user database 730 of the database 130.

If the distance between the passenger terminal device 120 and the driver device 140 is less than the preset threshold value, the process may proceed to step 1930. Alternatively, in response to determining that the distance between the passenger terminal device 120 and the driver device 140 is greater than or equal to the present threshold value, the process can proceed to step 1910 and the positioning engine 110 may continue to obtain the preliminary positioning information of the passenger terminal device 120 and the driver device 140.

In step 1930, the positioning engine 110 may send instructions to the passenger terminal device 120 and/or the driver terminal device 140 via the passenger interface 230 and/or the driver interface 240, so that the distance measuring devices of one or more of the parties may be turned on. The distance measuring device may refer to a device that is capable of measuring the distance between objects using a distance measuring technology. The distance measuring device may be integrated in the passenger terminal device 120 or the driver terminal device 140 (e.g., the distance measuring device may be integrated in the communication module 640). The distance measuring device may be an external device connected with the passenger terminal device 120/the driver terminal device 140. The distance measuring technology may be based on electromagnetic wave, acoustic wave, or other waves, or any combination thereof.

For example, the distance measuring technology may be based on electromagnetic wave such as radio wave, infrared ray, visible light, or the like, or any combination thereof. The distance measuring technology may be based on radio wave such as the Bluetooth® band, or other microwave bands. The distance measuring technology may be based on infrared ray such as near-infrared ray, middle infrared ray, far-infrared ray, or the like, or any combination thereof.

The distance measuring technology may be based on acoustic wave such as ultrasonic, infrasonic wave, acoustic waves of other frequency bands, or the like, or any combination of.

The distance measuring technology based on electromagnetic wave or acoustic wave may be based on one or more of multiple principles to measure a distance.

For example, the distance measuring technology based on electromagnetic wave or acoustic wave may be based on wave propagation time, Doppler effect, signal strength, signal attenuation characteristic, or the like, or any combination thereof.

In some embodiments, the instructions of the positioning engine 110 may instruct one or more distance measuring devices to be turned on. The distance measuring devices of the parties may be instructed to be turned on simultaneously, or only one of them may be instructed to be turned on.

In some embodiments, the positioning engine 110 may not send instructions to the distance measuring devices of the passenger terminal device 120 and/or the driver terminal device 140, but may send the instructions to a public distance measuring device that does not belong to the passenger terminal device 120 or the driver terminal device 140 to turn on the public distance measuring device. The public distance measuring device may be an information source 160 in the on-demand service system 105 or the network environment 100. The public distance measuring device may obtain the distance information or the direction information of one or more of the parties by measuring the distance between the passenger terminal device 120 and the driver device 140

When the distance measuring device is turned on, the positioning engine 110 may obtain distance measuring data sent by the distance measuring device in step 1940 and the current distance between the parties. The distance measuring data may be original data, intermediate data, final data (e.g., the distance measuring data may be a calculated distance between the parties), or the like, or any combination thereof. The distance between the parties may be directly included in the distance measuring data obtained by the positioning engine 110. The distance between the passenger and the driver may also be the distance measuring data obtained by calculating and processing by the processing module 210 of the positioning engine 110.

In step 1950, the positioning engine 110 may send the current distance obtained in step 1940 to the passenger terminal device 120 and the driver terminal device 140 via the passenger interface 230 and the driver interface 240 via the network 150, respectively, so that the passenger terminal device 120 and the driver terminal device 140 may display the distance by their respective content presentation module 610.

It should be noted that the above description of the positioning engine 110 coordinates the distance measuring process of the parties is provided for the purposes of illustration, and not intended to limit the scope of the present disclosure. For persons having ordinary skills in the art, any combinations of the above steps, various variations and modifications of coordinating the distance measuring process may be conducted under the teaching of the present disclosure. However, those variations and modifications may not depart the spirit and scope of this disclosure. For example, if one of the parties directly obtains the current distance between the passenger and the driver, the positioning engine 110 may send the current distance to the opposite party. For example, the distance measurement between the passenger terminal device 120 and the driver terminal device 140 may be performed based on the direct communication between the two parties without the coordination of the positioning engine 110. More particularly, one of the two parties may send a request to require the opposite party to turn on the distance measuring device and to perform the distance measurement, or the like, by the communication module 640. After the distance measuring device of the opposite party is turned on, the above distance measuring process may be completed and the distance measuring data may be obtained.

FIG. 19-B is a flow chart of an exemplary process for distance measurement when the passenger terminal device 120 is in proximity to the driver terminal device 140 according to some embodiments of the present disclosure.

In step 1915, the driver terminal device 140 may obtain its own positioning information. In some embodiments, the driver terminal device 140 may obtain the positioning information by the positioning module 630. In some embodiments, the positioning information obtained by the driver terminal device 140 may be the passenger input information obtained by the I/O module 620. The user input information may be text information, voice information, or image information. More particularly, the image information may be still image information or video information.

In step 1925, the driver terminal device 140 may send the obtained positioning information by the communication module 640. The positioning information may be obtained by the system 105 or the passenger terminal device 120.

In step 1935, the driver terminal device 140 may determine that whether an instruction of turning on the distance measuring device integrated in the driver terminal device 140 from the positioning engine 110 is received. The process may proceed to step 1945 in response to determining that the instruction is received. Alternatively, the process may return to step 1915 to continue to acquire the positioning information in response to determining that an instruction of turning on the distance measuring device on the driver terminal device 140 from the positioning engine 110 is not received.

According to some embodiments of the present disclosure, in step 1935, content waiting to be determined may not be an instruction from the positioning engine 110, but may be a request from the passenger terminal device 120. The content of the request is to request the driver terminal device 140 to turn on the distance measuring device.

In some embodiments, the driver terminal device 140 may directly perform step 1945 after step 1925 without determining whether an instruction is received.

In step 1945, the driver terminal device 140 may turn on the distance measuring device to measure the distance between the driver terminal device 140 and the passenger terminal device 120. The distance measuring methods and the distance measuring principles used by the distance measuring devices may be found in the previous contents, and will not be further described here.

In some embodiments, the driver device 140 may obtain the distance measuring data by turning on the distance measuring device. The distance measuring data may be original data, intermediate data, final data (e.g., the distance measuring data may be a calculated distance between the parties), a direction of the opposite party of measuring distance process, or the like, or any combination thereof.

In step 1955, the driver terminal device 140 may send the distance measuring data to one or more devices by the communication module 640 via the network 150. In some embodiments, the devices described above may include a passenger terminal device 120, a system 105, or other devices such as a third-party computing device, or the like. By sending the distance measuring data to the devices, the driver terminal device 140 may make the devices obtain the distance between the driver and the passenger and provide useful information for the meeting of the passenger and the driver. According to some embodiments of the present disclosure, the distance measuring data may be original data, intermediate data, final data (e.g., the distance measuring data may be a calculated distance between the parties), or the like, or any combination thereof. Correspondingly, the distance measuring data may be processed by other objects such as the passenger terminal device 120, the system 105, or other computing devices to obtain the distance between the parties. The distance measuring data may also be processed locally to obtain the distance between the parties, for example, the distance measuring data may be processed by the driver terminal device 140.

In particular, the driver device 140 may send the distance measuring data to the passenger terminal device 120 for the passenger terminal device 120 to display the distance measuring data.

In step 1965, the driver terminal device 140 may obtain the distance between the driver and the passenger. In some embodiments, the distance may be obtained from the passenger terminal device 120, the system 105, or other computing devices. In some embodiments, the driver terminal device 140 may display the distance by the content presentation module 610.

According to some embodiments of the present disclosure, after the driver terminal device 140 processes and calculates the distance between parties (e.g., a passenger and a driver), the driver terminal device 140 may not perform step 1965.

It should be noted that the above description of the distance measurement of the two parties (the passenger and the driver) by the driver terminal device 140 is provided for the purposes of illustration, and not intended to limit the scope of the present disclosure. However, those variations and modifications may not depart the spirit and scope of this disclosure. For persons having ordinary skills in the art, any combinations of the above steps, various variations and modifications of performing the above process may be conducted under the teaching of the present disclosure. For example, step 1935 (determining operation) is not necessary, or step 1965 (obtaining distance) is not necessary. All such modifications are within the protection scope of the present disclosure.

Figure 20:
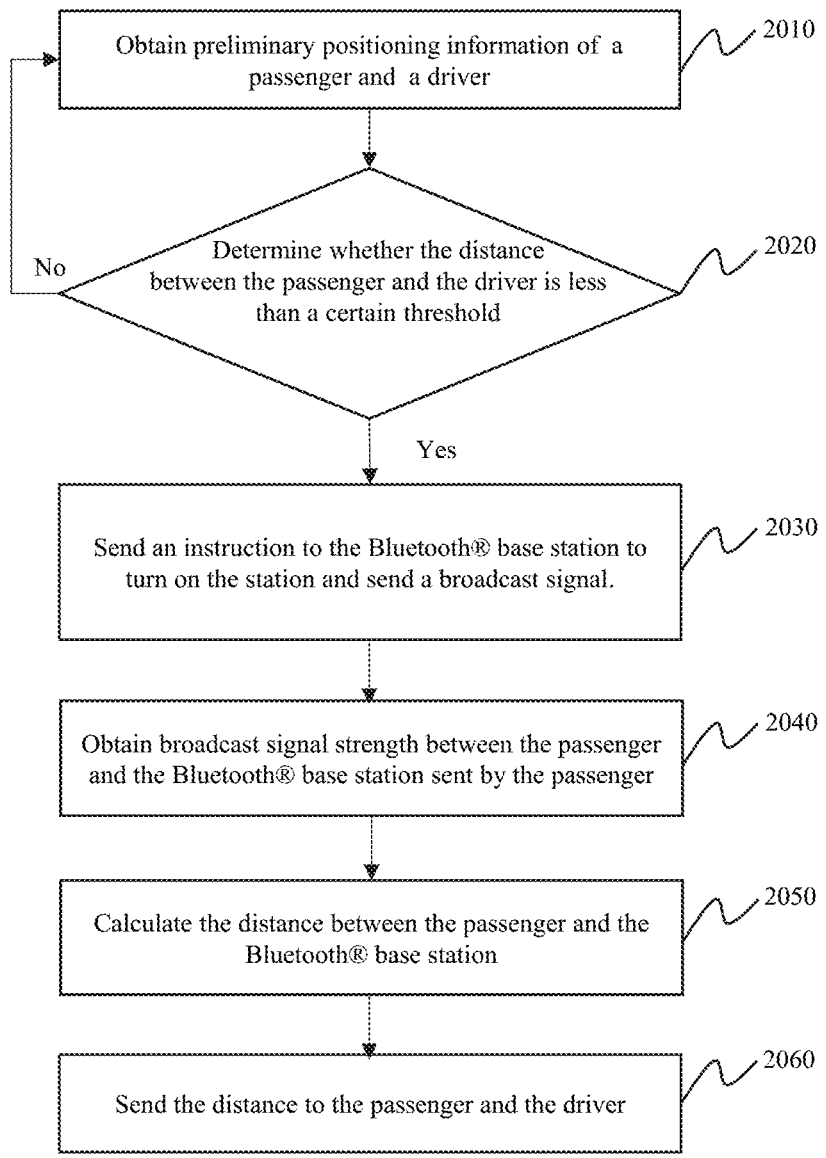
FIG. 20 is a flow chart of an exemplary process for measuring distance form a positioning engine to a passenger terminal device by a positioning engine by a Bluetooth® base station according to some embodiments of the present disclosure.

FIG. 20 is a flow chart of an exemplary process for distance measurement for the passenger terminal device 120 by the positioning engine 110 through Bluetooth® base station according to some embodiments of the present disclosure.

In step 2010, the positioning engine 110 may obtain the preliminary positioning information of the passenger terminal device 120 and the driver terminal device 140 via the passenger interface 230 and the driver interface 240, respectively. According to some embodiments, the preliminary positioning information of the passenger terminal device 120 and the driver terminal device 140 may be information in different forms. For example, the preliminary positioning information may be text input information, icon information in an image interface, or positioning information determined using one or more positioning technologies. The information may or may not be obtained in real-time. The preliminary positioning information of the passenger terminal device 120 and the driver terminal device 140 may or may not be obtained at the same time. For example, the preliminary positioning information of the passenger terminal device 120 may be obtained in non real-time. The preliminary positioning information of the driver terminal device 140 may be obtained in real-time, and vice versa. The positioning engine 110 may calculate the distance between the passenger and the driver by the processing module 210 based on the obtained preliminary positioning information of the passenger terminal device 120 and the driver terminal device 140. As described above, the distance may be the straight-line distance, the shortest road distance, or the shortest travel distance.

In step 2020, the positioning engine 110 may perform a decision-making on the distance between the passenger terminal device 120 and the driver terminal 140 to determine whether the distance between the passenger and the driver is less than a certain threshold. The process may proceed to step 2030 in response to determining that the distance between the passenger and the driver is less than the certain threshold. Alternatively, the process may return to step 2010 in response to determining that the distance between the passenger and the driver is greater or equal to the certain threshold.

The detailed descriptions of the decision-making may be found in above disclosure in FIGS. 19-A and 19-B, and will not be further described here.

It should be noted that the threshold may be determined based on factors such as signal coverage area or measuring range of Bluetooth® base station. The determination of the threshold may be determined based on historical orders of one or more parties (the passenger and/or the driver). The historical order information may be obtained by retrieving or inquiring the historical order database 710 of the database 130. The determination of the threshold may be obtained based on geographic area or particular location of the passenger terminal device 120 and the driver terminal device 140. The particular geographic area or the particular location information may be obtained by retrieving or inquiring the map database 720 of the database 130. The determination of the threshold may be obtained based on personal preference of the passenger and the driver. The personal preference may be obtained by retrieving or inquiring user information that is stored in the user database 730 of the database 130.

More particularly, the threshold may be determined based on a radius of the signal coverage area of a Bluetooth® base station. For example, if the radius of the signal coverage area of the Bluetooth® base station is 50 meters, the preset threshold may be set as 50 meters. Certainly, it also may be set as required. For example, considering calculation accuracy, the preset threshold may be less than the value of the radius of the signal coverage area of the Bluetooth® base station. For example, if the radius of the signal coverage area of the Bluetooth® base station is 50 meters, the preset threshold may be set as 40 meters, 30 meters, 20 meters, or the like.

In step 2030, the positioning engine 110 may send an instruction to the Bluetooth® base station to turn on the station and send a broadcast signal. According to some embodiments, the Bluetooth® base station may determine locations of other objects using the Bluetooth® positioning technology and calculate the distance between each of objects and the Bluetooth® base station. The number of the Bluetooth® base stations may be one or more. The Bluetooth® base station may be a public Bluetooth® base station. For example, it may be installed on a facility which can be accessed by the public. The Bluetooth® base station may also be a private Bluetooth® base station. For example, it may be installed around the passenger and/or the driver. According to some embodiments of the present disclosure, the Bluetooth® base station may be located in proximity to the driver terminal device 140 (e.g., the station may be set on the car of the driver). Thus, the distance between the passenger terminal device 120 and the Bluetooth® base station may be designated as the current distance between the passenger terminal device 120 and the driver terminal device 140.

In some embodiments, the Bluetooth® base station may be an iBeacon Bluetooth® base station. The iBeacon released by Apple Inc. is a Bluetooth® base station protocol based on Bluetooth® 4.0. When a passenger terminal device 120 supporting iBeacon enters the signal coverage area of an iBeacon Bluetooth® base station, the passenger terminal device 120 may obtain broadcast signal sent by the iBeacon Bluetooth® base station. The distance between the passenger terminal device 120 and the iBeacon Bluetooth® base station may be calculated based on the signal strength of the broadcast signal.

It should be noted that the above description of the Bluetooth® base station is merely illustrative, and not intended to limit the scope of the present disclosure. For persons having ordinary skills in the art, any combinations of the above steps, various variations and modifications of performing the above process may be conducted under the teaching of the present disclosure. However, those variations and modifications may not depart the spirit and scope of this disclosure. For example, the Bluetooth® base stations may be other Bluetooth® base stations with similar function In step 2040, the positioning engine 110 may obtain broadcast signal strength between the passenger terminal device 120 and the Bluetooth® base station sent by the passenger terminal device 120 via the passenger interface 230. In step 2040, except obtaining the broadcast signal strength, the positioning engine 110 may obtain other information (e.g., the positioning engine 110 may obtain an identifier and identity information of the Bluetooth® base station, a distance between the passenger terminal device 120 and the Bluetooth® base station, other parameters of communication between the passenger terminal device 120 and the Bluetooth® base station, etc.). More particularly, the identifier or the identity information may include but is not limited to MAC address, universal unique identification (UUID), or the like. The other parameters of communication between the passenger terminal device 120 and the Bluetooth® base station may include frequency band, power, signal to noise ratio (SNR), parameters relating to frame, other channel parameters of Bluetooth® communication, or the like. Base on the above information, the positioning engine 110 may calculate the distance between the passenger terminal device 120 and the Bluetooth® base station in step 2050.

In step 2060, the positioning engine 110 may send the distance to the passenger terminal device 120 and the driver terminal device 140 via the passenger interface 230 and the driver interface 240 to make at least one of the parties display the distance information.

It should be noted that the above description of the process of calculating the distance between the passenger terminal device 120 and the Bluetooth® base station by the positioning engine 110 is provided for the purposes of illustration, and not intended to limit the scope of the present disclosure. For persons having ordinary skills in the art, any combinations of the above steps, various variations and modifications of performing the above process may be conducted under the teaching of the present disclosure. However, those variations and modifications may not depart the spirit and scope of this disclosure. For example, when the passenger terminal device 120 and/or the Bluetooth® base station have already calculated the distance between them, step 2050 may be skipped, for example, the positioning engine 110 may not perform step 2050 and step 2060 after step 2040. The positioning engine 110 may also perform step 2060 after step 2040, and send the distance to one party of the passenger terminal device 120 and the driver terminal device 140. As another example, the Bluetooth® base station may position the passenger terminal device 120 and the driver terminal device 140 and measure the distance between them simultaneously, and then calculate the distance and direction between the parties based on the information of the parties and send the distance and the direction to the parties in step 2060. As another example, the distance measurement between the passenger terminal device 120 and the Bluetooth® base station may not need to be coordinated by the positioning engine 110. The communication module 640 of the passenger terminal device 120 or the driver terminal device 140 may send a request to the Bluetooth® base station to request the Bluetooth® base station to start to broadcast. Meanwhile, after the passenger terminal device 120 obtains the broadcast, the communication module 640 of the passenger terminal device may obtain strength of the broadcast signal and other information of the communication between the passenger terminal device 120 and the Bluetooth® base station. The passenger terminal device 120 may report the strength of the broadcast signal and other information to the driver terminal device 140 through the communication module 640 to make the processing module 640 of the driver terminal device 140 process and calculate the distance between the passenger terminal device 120 and the Bluetooth® base station. Alternatively, the passenger terminal device 120 may obtain the distance between the passenger terminal device 120 and the Bluetooth® base station by processing and calculating, and send the distance information to the driver terminal device 140 through the communication module 640.

Similarly, the distance measurement for the driver terminal device 140 by the Bluetooth® base station may be found in the description of the distance measurement for the passenger terminal device 120.

Figure 21:
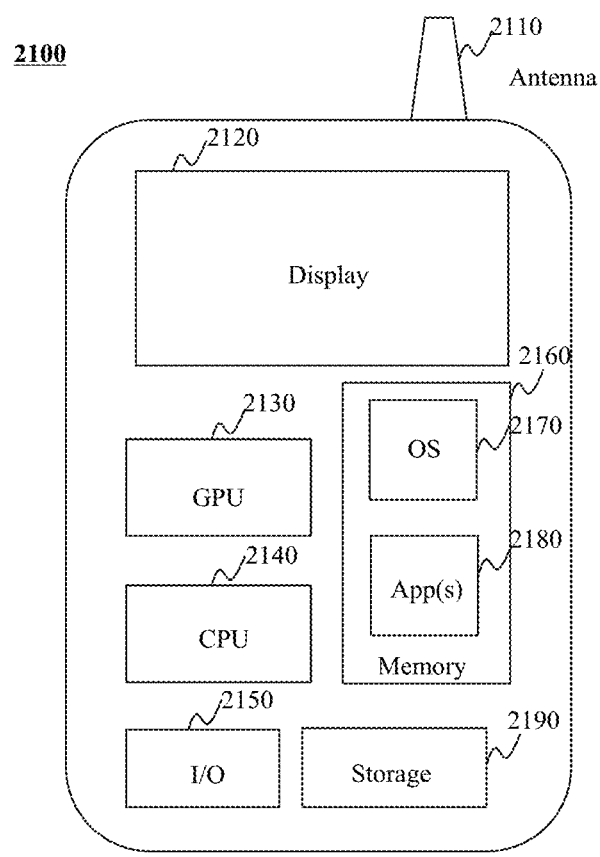
FIG. 21 illustrates a structure of a mobile device that is configured to implement a specific system disclosed in the present disclosure.

FIG. 21 illustrates a structure of a mobile device that is configured to implement a specific system disclosed in the present disclosure. In some embodiments, a user terminal device configured to display and communicate information related to locations may be a mobile device 2100. The mobile device may include but is not limited to a smart phone, a tablet computer, a music player, a portable game console, a GPS receiver, a wearable calculating device (e.g. glasses, watches, etc.), or the like. The mobile device 2100 may include one or more central processing units (CPUs) 2140, one or more graphical processing units (GPUs) 2130, a display 2120, a memory 2160, an antenna 2110 (e.g. a wireless communication unit), a storage unit 2190, and one or more input/output (I/O) devices 2150. Moreover, the mobile device 2100 may also be any other suitable component that includes but is not limited to a system bus or a controller (not shown in FIG. 21). As shown in FIG. 21, a mobile operating system 2170 (e.g. IOS, Android, Windows Phone, etc.) and one or more applications 2180 may be loaded from the storage unit 2190 to the memory 2160 and implemented by the CPUs 2140. The application 2180 may include a browser or other mobile applications configured to receive and process information related to locations in the mobile device 2100. The passenger/driver may obtain communication information related to locations through the system I/O device 2150, and provide the information to the positioning engine 110 and/or other modules or units of the system 100, e.g. the network 150.

In order to implement various modules, units and their functions described above, a computer hardware platform may be used as hardware platforms of one or more elements (e.g., the positioning engine 110 and/or other sections of the system 100 described in FIG. 1 through FIG. 20). Since these hardware elements, operating systems and program languages are common, it may be assumed that persons skilled in the art may be familiar with these techniques and they may be able to provide information required in the on-demand service according to the techniques described in the present disclosure. A computer with user interface may be used as a personal computer (PC), or other types of work stations or terminal devices. After being properly programmed, a computer with user interface may be used as a server. It may be considered that those skilled in the art may also be familiar with such structures, programs, or general operations of this type of computer device. Thus, extra explanations are not described for the Figures.

Figure 22:
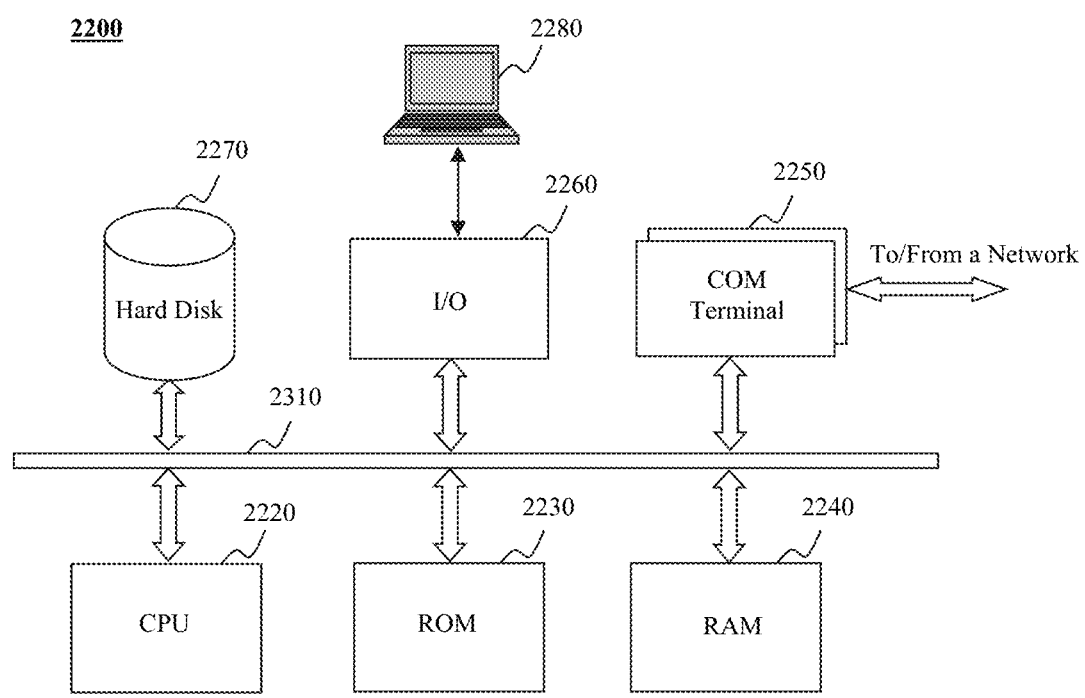
FIG. 22 illustrates a structure of a computer device that is configured to implement a specific system disclosed in the present disclosure.

FIG. 22 illustrates a structure of a computing device that is configured to implement a specific system disclosed in the present disclosure. The particular system may use a functional block diagram to explain the hardware platform containing one or more user interfaces. The computer may be a computer with general or specific functions. Both types of the computers may be configured to implement any particular system according to some embodiments of the present disclosure. The computer 2200 may be configured to implement any components that provides information required by the on-demand service disclosed in the present description. For example, the positioning engine 110 may be implemented by hardware devices, software programs, firmware, or any combination thereof of a computer like the computer 2200. For brevity, FIG. 22 depicts only one computer. In some embodiments, the functions of the computer, providing information that on-demand services may require, may be implemented by a group of similar platforms in a distributed mode to disperse the processing load of the system.

The computer 2200 may include a communication terminal 2250 that may connect with a network that may implement the data communication. The computer 2200 may also include a CPU that is configured to execute instructions and includes one or more processors. The schematic computer platform may include an internal communication bus 2210, different types of program storage units and data storage units, e.g. a hard disk 2270, a read-only memory (ROM) 2230, a random-access memory (RAM) 2240), various data files applicable to computer processing and/or communication, and some program instructions executed possibly by the CPU. The computer 2200 may also include an I/O device 2260 that may support the input and output of data flows between the computer and other components (e.g. a user interface 2280). Moreover, the computer 2200 may receive programs and data via the communication network.

Various aspects of methods of providing information required by on-demand service and/or methods of implementing other steps by programs are described above. The programs of the technique may be considered as "products" or "artifacts" presented in the form of executable codes and/or relative data. The programs of the technique may be joined or implemented by the computer readable media. Tangible and non-volatile storage media may include any type of memory or storage that is applied in computer, processor, similar devices, or relative modules. For example, the tangible and non-volatile storage media may be various types of semiconductor storages, tape drives, disc drives, or similar devices capable of providing storage function to software at any time.

Some or all of the software may sometimes communicate via a network, e.g. the Internet or other communication networks. This kind of communication may load a software from a computer device or a processor to another. For example, a software may be loaded from a management server or a main computer of the on-demand service system to a hardware platform in a computer environment, or to other computer environments capable of implementing the system, or to systems with similar functions of providing information required by on-demand service. Correspondingly, another media used to transmit software elements may be used as physical connections among some of the equipment. For example, light wave, electric wave, electromagnetic wave, etc. may be transmitted by cables, optical cables or air. Physical media used to carry waves, e.g. cable, wireless connection, optical cable, or the like, may also be considered as media of hosting software. Herein, unless the tangible "storage" media is particularly designated, other terminologies representing the "readable media" of a computer or a machine may represent media joined by the processor when executing any instruction.

A computer readable media may include a variety of forms, including but is not limited to tangible storage media, wave-carrying media or physical transmission media. Stable storage media may include compact disc, magnetic disk, or storage systems that are applied in other computers or similar devices and may achieve all the sections of the system described in the drawings. Unstable storage media may include dynamic memory, e.g. the main memory of the computer platform. Tangible transmission media may include coaxial cable, copper cable and optical fiber, including circuits forming the bus in the internal of the computer system. Wave-carrying media may transmit electric signals, electromagnetic signals, acoustic signals or light wave signals. And these signals may be generated by radio frequency communication or infrared data communication. General computer readable media may include hard disk, floppy disk, magnetic tape, or any other magnetic media; CD-ROM, DVD, DVD-ROM, or any other optical media; punched cards, or any other physical storage media containing aperture mode; RAM, PROM, EPROM, FLASH-EPROM, or any other memory chip or magnetic tape; carrying waves used to transmit data or instructions, cable or connection devices used to transmit carrying waves, or any other program code and/or data accessible to a computer. Most of the computer readable media may be applied in executing instructions or transmitting one or more results by the processor.

It may be understood to those skilled in the art that various alterations and improvements may be achieved according to some embodiments of the present disclosure. For example, the various components of the system described above are all achieved by hardware equipment. In fact, the various components of the system described above may be achieved merely by software, e.g. installing the system on the current server. Additionally or alternatively, the location information disclosed here may be provided by a firmware, a combination of a firmware and a software, a combination of a firmware and a hardware, or a combination of a firmware, a hardware and a software.

The present disclosure and/or some other examples have been described in the above. According to descriptions above, various alterations may be achieved. The topic of the present disclosure may be achieved in various forms and embodiments, and the present disclosure may be further used in a variety of application programs. All applications, modifications and alterations required to be protected in the claims may be within the protection scope of the present disclosure.

What is claimed is:

1. A method implemented on a computing device having at least one processor, at least one computer-readable storage medium, and a communication platform connected to a network, comprising:

receiving first electrical signals encoding service request information from a service requester, wherein the service request information includes an original location of the service requester;

operating a positioning engine in the at least one processor using one or more positioning technologies including GPS to determine an optimized original location of the service requester within a preset range from the original location;

operating logical circuits in the at least one processor to determine a candidate meetup location set based at least in part on the optimized original location of the service requester, wherein the candidate meetup location set includes at least one candidate meetup location;

generating second electrical signals encoding the candidate meetup location set to send to the service requester;

receiving, from the service requester, third electrical signals encoding processed data related to the candidate meetup location set;

operating the positioning engine to evaluate the processed data including one or more processed candidate meetup locations, wherein the evaluation is made based on road conditions around the one or more processed candidate meetup locations, and relative orientations between the one or more processed candidate meetup locations and a destination of the service requester;

operating the logical circuits in the at least one processor to determine a final meetup location based at least in part on the evaluations;

while a service provider is driving toward to the final meetup location, the positioning engine is directed to:
    obtain preliminary positioning information of a passenger and the service provider by the one or more positioning technologies;
    send an instruction to a base station to turn on the station and send a broadcast signal when a distance between the service requester and the service provider is less than a certain threshold based on the preliminary positioning information;
    obtain broadcast signal strength between the service requester and the base station sent by the service requester;
    determine a distance between the passenger and the base station based on the broadcast signal strength; and
    send the distance to the service requester and the service provider.

2. The method of claim 1, wherein the processed data related to the candidate meetup location set is generated by processing the candidate meetup location set by the service requester, wherein the processing includes at least one of:
  operating the logical circuits in the at least one processor to select a candidate meetup location from the candidate meetup location set;
  operating the logical circuits in the at least one processor to remove a candidate meetup location from the candidate meetup location set;
  operating the logical circuits in the at least one processor to modify a candidate meetup location of the candidate meetup location set;
  operating the logical circuits in the at least one processor to determine a location that does not belong to the candidate meetup location set, or
  operating the logical circuits in the at least one processor to add the location to the candidate meetup location set.

3. The method of claim 1, further comprising generating fourth electrical signals encoding the candidate meetup location set to send to the service provider.

4. The method of claim 3, further comprising receiving, from the service provider, fifth electrical signals encoding the processed data related to the candidate meetup location.

5. The method of claim 4, wherein the processed data related to the candidate meetup location set is generated by processing the candidate meetup location set by the service provider, wherein the processing includes at least one of:
  operating the logical circuits in the at least one processor to select a candidate meetup location from the candidate meetup location set;
  operating the logical circuits in the at least one processor to remove a candidate meetup location from the candidate meetup location set;
  operating the logical circuits in the at least one processor to modify a candidate meetup location of the candidate meetup location set;
  operating the logical circuits in the at least one processor to determine a location that does not belong to the candidate meetup location set, or
  operating the logical circuits in the at least one processor to add the location that does not belong to the candidate meetup location set to the candidate meetup location set.

6. The method of claim 3, further comprising generating sixth electrical signals encoding the final meetup location to send to the service provider.

7. The method of claim 1, further comprising operating the logical circuits in the at least one processor to evaluate the candidate meetup location.

8. The method of claim 7, wherein the evaluation of the candidate meetup location is based on a distance between the candidate meetup location and the location of the service requester.

9. The method of claim 7, wherein the evaluation of the candidate meetup location is based on historical information relating to the candidate meetup location.

10. The method of claim 1, further comprising generating seventh electrical signals encoding the final meetup location to send to a service provider.

11. A system, comprising:
  at least one storage medium including a set of instructions;
  at least one processor in communication with the at least one storage medium, wherein when executing the set of instructions, the at least one processor is directed to:
    receive first electrical signals encoding service request information from a service requester, wherein the service request information includes a location of the service requester;
    operate a positioning engine in the at least one processor using one or more positioning technologies including GPS to determine an optimized original location of the service requester within a preset range from the original location;
    operate logical circuits in the at least one processor to determine a candidate meetup location set at least partially based on the optimized original location of the service requester, wherein the candidate meetup location set includes at least one candidate meetup location:
    generate second electrical signals encoding the candidate meetup location set to send to the service requester;
    receive, from the service requester, third electrical signals encoding processed data related to the candidate meetup location set;
    operate the positioning engine to evaluate the processed data including one or more processed candidate meetup locations, wherein the evaluation is made based on road conditions around the one or more processed candidate meetup locations, and relative orientations between the one or more processed candidate meetup locations and the destination of the service requester;
    operate the position engine to determine a final meetup location based at least in part on the evaluation;
    while service provider is driving toward to the final meetup location, the positioning engine is directed to:
    obtain preliminary positioning information of a passenger and the service provider by the one or more positioning technologies;
    send an instruction to a base station to turn on the station and send a broadcast signal when a distance between the service requester and the service provider is less than a certain threshold based on the preliminary positioning information;
    obtain broadcast signal strength between the service requester and the base station sent by the service requester;
    determine a distance between the passenger and the base station based on the broadcast signal strength; and
    send the distance to the service requester and the service provider.

12. The system of claim 11, wherein the processed data related to the candidate meetup location set is generated by processing the candidate meetup location set by the service requester, wherein the at least one processor is further directed to:
  operate the logical circuits in the at least one processor to select a candidate meetup location from the candidate meetup location set;
  operate the logical circuits in the at least one processor to remove a candidate meetup location from the candidate meetup location set;
  operate the logical circuits in the at least one processor to modify a candidate meetup location of the candidate meetup location set;
  operate the logical circuits in the at least one processor to determine a location that does not belong to the candidate meetup location set, or
  operate the logical circuits in the at least one processor to add the location to the candidate meetup location set.

13. The system of claim 11, wherein the at least one processor is further directed to generate fourth electrical signals encoding the candidate meetup location set to send to the service provider.

14. The system of claim 13, wherein the at least one processor is further directed to receive, from the service provider, fifth electrical signals encoding the processed data related to the candidate meetup location set.

15. The system of claim 14, wherein the processed data related to the candidate meetup location set is generated by processing the candidate meetup location set by the service provider, wherein the at least one processor is further directed to:

operate the logical circuits in the at least one processor to select a candidate meetup location of the candidate meetup location set;

operate the logical circuits in the at least one processor to remove a candidate meetup location of the candidate meetup location set;

operate the logical circuits in the at least one processor to modify a candidate meetup location of the candidate meetup location set;

operate the logical circuits in the at least one processor to determine a location that does not belong to the candidate meetup location set, or operate the logical circuits in the at least one processor to add the location that does not belong to the candidate meetup location set to the candidate meetup location set.

16. The system of claim 13, wherein the at least one processor is further directed to generate sixth electrical signals encoding the final meetup location to send to the service provider.

17. The system of claim 11, wherein the at least one processor is further directed to operate the logical circuits in the at least one processor to evaluate the candidate meetup location.

18. The system of claim 17, wherein the at least one processor is further directed to operate the logical circuits in the at least one processor to evaluate the candidate meetup location based on a distance between the candidate meetup location and the location of the service requester.

19. The system of claim 17, wherein the at least one processor is further directed to operate the logical circuits in the at least one processor to evaluate the candidate meetup location based on historical information relating to the candidate meetup location.

20. The system of claim 11, wherein the at least one processor is further directed to generate seventh electrical signals encoding the final meetup location to send to a service provider.

* * * * *